US006882442B2

(12) United States Patent
Roberts

(10) Patent No.: US 6,882,442 B2
(45) Date of Patent: Apr. 19, 2005

(54) SYSTEM AND METHOD FOR BAR CODE RENDERING AND RECOGNITION

(76) Inventor: Gregory B. Roberts, 280 Eunice, Mountain View, CA (US) 94040

( * ) Notice: Subject to any disclaimer, the term of this patent is extended or adjusted under 35 U.S.C. 154(b) by 0 days.

(21) Appl. No.: 10/314,267

(22) Filed: Dec. 9, 2002

(65) Prior Publication Data

US 2003/0117635 A1 Jun. 26, 2003

Related U.S. Application Data

(63) Continuation of application No. 09/543,736, filed on Apr. 5, 2000, now Pat. No. 6,493,110.

(51) Int. Cl.[7] .............................................. G06F 15/00
(52) U.S. Cl. ...................... 358/1.2; 358/1.18; 400/102; 235/462
(58) Field of Search ............................... 358/1.2, 1.12, 358/1.13, 1.14, 1.15, 1.18; 400/74, 102, 103, 104, 120; 235/462, 463, 494; 332/112

(56) References Cited

U.S. PATENT DOCUMENTS

| 4,674,041 A | 6/1987 | Lemon et al. ................ 705/14 |
| 5,176,224 A | 1/1993 | Spector ....................... 186/52 |
| 5,185,695 A | 2/1993 | Pruchnicki .................... 705/14 |
| 5,249,044 A | 9/1993 | Von Kohorn ................. 725/23 |
| 5,285,278 A | 2/1994 | Holman ........................ 725/23 |
| 5,287,181 A | 2/1994 | Holman ....................... 348/473 |
| 5,761,648 A | 6/1998 | Golden et al. ................ 705/14 |
| 5,835,615 A | 11/1998 | Lubow et al. .............. 382/112 |
| 5,845,259 A | 12/1998 | West et al. .................... 705/14 |
| 5,871,288 A * | 2/1999 | Ryan, Jr. et al. ............ 400/103 |
| 6,230,143 B1 | 5/2001 | Simons et al. ................ 705/14 |

* cited by examiner

Primary Examiner—Mark Wallerson
(74) Attorney, Agent, or Firm—Pillsbury Winthrop LLP

(57) ABSTRACT

A method and system for rendering accurate bar code images in a distributed network wherein a plurality of different types of rendering devices, such as printers, having different resolution characteristics are connected for rendering such images. The resolution of a connected rendering device is detected and the bar code image to be rendered by such device is scaled to effect proper alignment of the resolution units of the bar code and the rendering device whereby the need for interpolation is effectively obviated. The bar code is scaled by a whole integer multiplier of the minimum bar code size based upon at least one dimension of the print area of the bar code display and the resolution characteristic of the rendering device. The bar code image is aligned or mapped and is centered in the display area with equal units of the excess print area on either side of the image. By avoiding the need to interpolate print data by the rendering device, the bar code rendering system defeats inaccuracies in detection and decoding and provides a more reliable data recovery system.

39 Claims, 13 Drawing Sheets

| EXPIRATION DATE | REDEMPTION AMOUNT | COMPANY AND PRODUCT DATA | UPC CODE | REDEMPTION ADDRESS | OFFER DESCRIPTION |
VARIABLE COUPON DATA FIELDS
| BORDER GRAPHICS | REDEMPTION INSTRUCTIONS | USER ID BAR CODE |
FIXED COUPON DATA FIELDS
FIG. 3
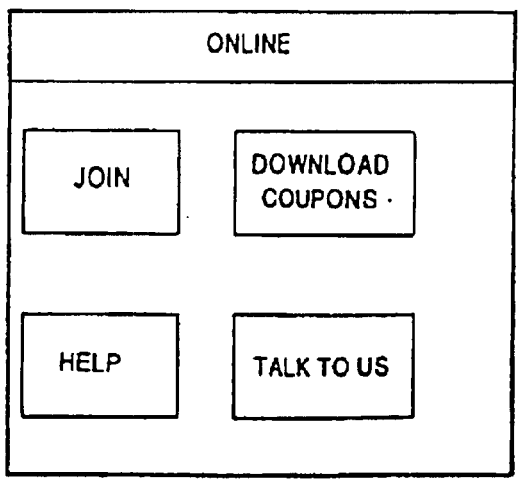
FIG. 4A
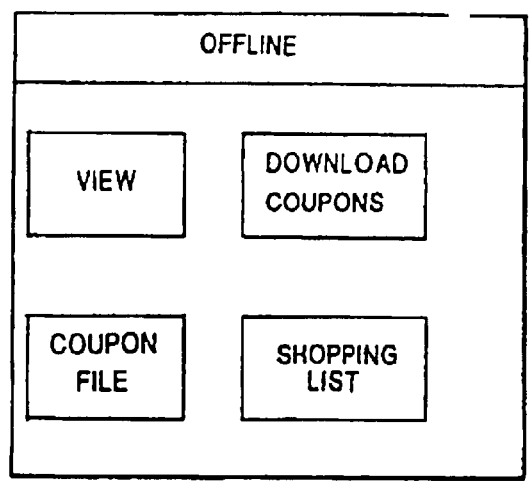
FIG. 4B

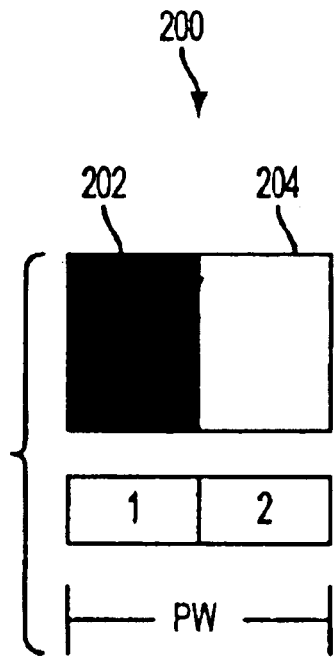 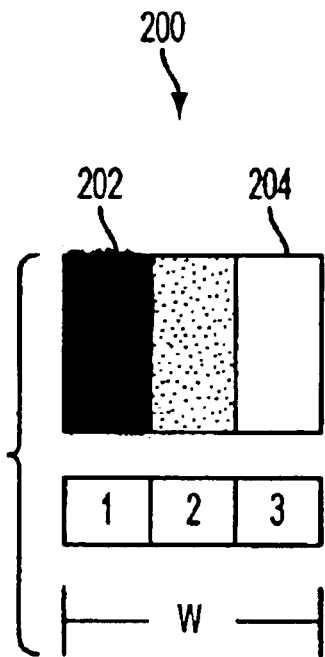 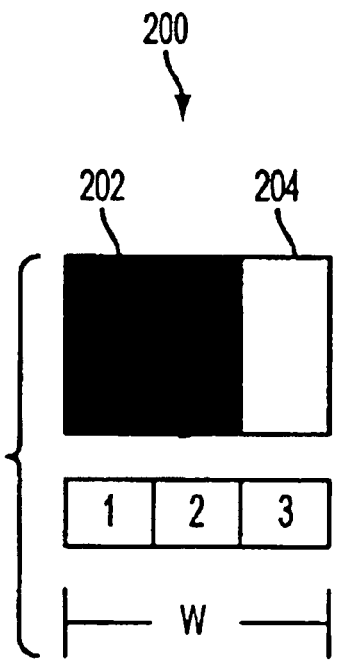
FIG. 11A   FIG. 11B   FIG. 11C
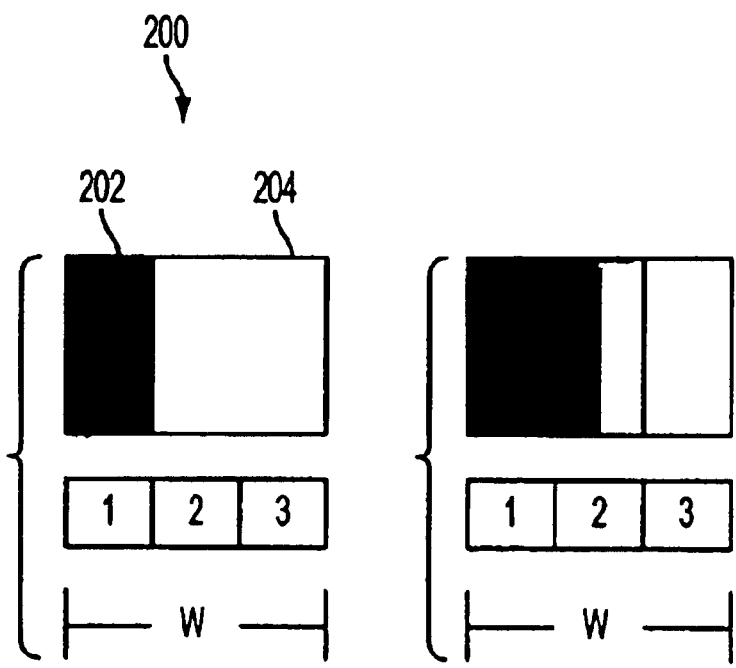
FIG. 11D   FIG. 11E

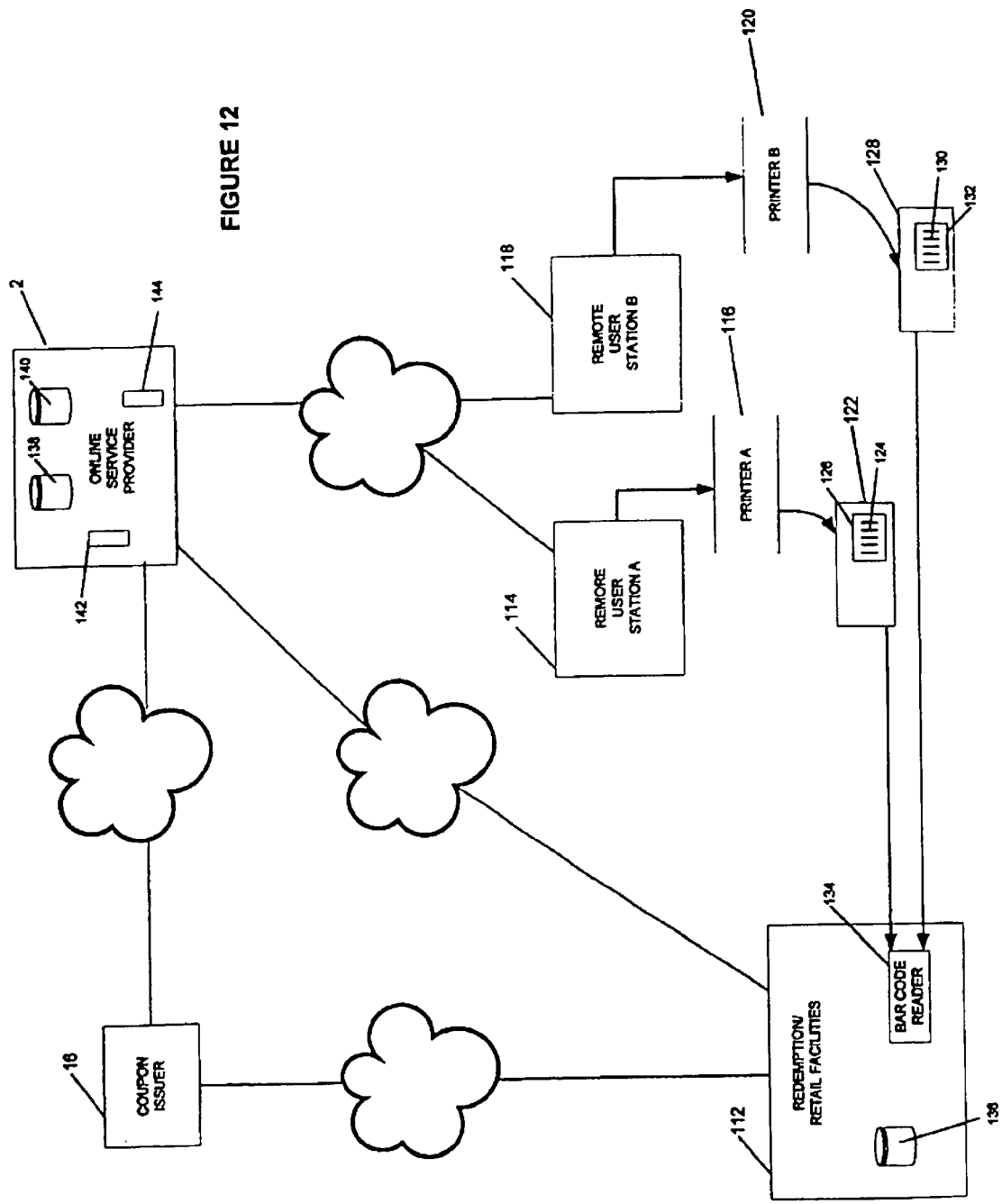

SYSTEM AND METHOD FOR BAR CODE RENDERING AND RECOGNITION

CROSS-REFERENCE TO RELATED APPLICATIONS

This Application is a continuation of U.S. patent application Ser. No. 09/543,736, filed Apr. 5, 2000, now U.S. Pat. No. 6,493,110 B1 (issued Dec. 10, 2002).

FIELD OF THE INVENTION

The invention relates to rendering bar codes for use on coupons, promotions and other incentives and for other purposes. The invention also relates to providing a method and system in a distributed network for electronic distribution of incentives, such as coupons, to a plurality of remote users and the management of information involved in such distribution.

BACKGROUND OF THE INVENTION

The present invention relates to the electronic distribution of secure money saving or discount coupons and other marketing incentives and in particular to use of a centrally located online computer system for interactively distributing such coupons to remotely connected consumer computers and for collecting user-specific data regarding coupon usage and user demographic information from the remote computers.

Millions of consumers regularly use product redemption coupons and realize substantial savings as a result. Significant time is spent clipping and sorting coupons, discarding expired coupons and organizing current coupons for use on shopping trips. Conventional coupon distribution results in significant wasted time due to consumers' attempts to manage their coupon use.

Coupons are delivered to consumers through a variety of media. The primary coupon distribution is via pull-out sections in newspapers, which are known as free standing inserts (FSIs). This accounts for just over 80% of coupons used. Other methods of distribution include in-store shelf coupon dispensers, check-out coupons (generally issued based on the customer's current purchase), register receipt coupons, in-product coupons, instant peel-off on-product coupons and direct mail coupons. In addition to manufacturers coupons, consumers use retail store coupons, such as those issued by large retail chains on a weekly basis.

Some consumers use coupons on a fairly random basis. These consumers tend not to keep coupons for future use, but will review coupons available just prior to shopping to see if any of them cover products they plan to buy or if there are any for new or improved products of interest.

More organized coupon users maintain some form of storage system to keep coupons for future use. These consumers often clip coupons regularly from all available sources, and often have coupon filing systems by product category. They will also review their coupons regularly, discarding unused coupons which have expired.

For most consumers, attempts to maintain an organized coupon file often fails. The "bother" and time required to maintain organized coupon files often results in neglect of those files, even though diligent shoppers know that a consistent significant savings is easily achievable using coupons.

The notion of issuing product redemption coupons to consumers was an innovative idea to entice consumers to try new products in the hope that, after the first try of a new product at a coupon discounted price, they would become repeat customers at the regular price. Coupons are effective tools used in launching new products. Manufacturers also find coupons can shore up flagging sales, help reduce excess inventory or win back consumers' brand loyalty, and so coupons for existing products have become customary, so much so that today's consumers have come to expect coupons. Often, coupon price incentives significantly reduce brand loyalty, and manufacturers must issue more coupons than desired to maintain market share. Market share also has been impacted by an increase in the number and variety of competing "no-name" store brands. The competitive nature of the retail industry does not allow manufacturers to reduce coupon distribution, and in some market sectors, such as cereals, the majority of purchases are made with coupons.

Consumers are most familiar with FSIs as a source for manufacturers' coupons. In 1993, the coupon redemption rate from FSIs was 2.3%, and gradually declining. The primary factors which keep the redemption rate low include consumers not needing or wanting the product advertised, consumers not bothering to clip coupons, losing clipped coupons or leaving them behind on shopping trips, lack of 100% distribution of newspapers, overcouponing within specific areas, and unavailability of new products when the coupon is issued.

Free standing inserts currently represents the largest share of the coupon distribution industry, roughly 80.2%. On average, manufacturers who use FSIs for coupon distribution, spend approximately $0.92 per coupon redeemed, which is the lowest redeemed cost per coupon redeemed when compared with other current coupon distribution methods. FSI coupon distribution results in high costs per coupon because of the shear complexity of and volume of materials involved in coupon distribution and redemption. Charges to manufacturers by FSI producers cover set-up, printing, paper, freight, newspaper insertion costs, sales and marketing, overhead, and profit.

Direct mail coupons accounted for approximately 4.4% of coupon distribution in 1992. Direct mail coupons may be issued as part of a nationwide campaign or a regional campaign, may be cooperative or solo, and may be mass, zip-code/lifestyle/lifestage segmented or household targeted. Regional direct mail coupons are more common, and are usually limited to marketing the products and/or services of local vendors. Companies who practice database marketing make use of direct mail campaigns for delivering targeted incentives.

Run-of-Press ("ROP") Coupons accounted for 4.1% of the coupons distributed in 1992. These coupons consist primarily of stand alone newspaper advertisements with clip-out coupons. Often these advertisements are specifically placed to coincide with a relevant feature article. This form or coupon is marketed directly or through third party coupon issuers who have the nationwide newspaper distribution channels through which to place ROP coupons.

In/on pack coupons accounted for 3.5% of the coupons distributed in 1992. On pack coupons consist of an attached coupon which is removed and redeemed at the cash register at the time of purchase. In pack coupons are found within the product and act as an incentive to customers to repurchase the same product. It is estimated that the actual cost per in/on pack coupon redeemed is significantly less than that associated with other coupon distribution methods. Most on-pack coupons are redeemed as customers pay for their purchases. However, this also means that all items are sold at the coupon discount, lowering a manufacturer's overall revenues per product more so than other types of coupons.

In 1992, various other coupon distribution methods represented 5% of coupons distributed. Two important coupon distribution methods in this category include shelf distribution and custom prepared coupon distribution. Thousands of stores use coupon dispensers which are attached to a product's shelf. Customers can pull out one coupon from the dispenser for the product advertised. This method of coupon distribution is designed to reach the consumer at the point of making a purchase decision, and has a redemption rate of approximately 18%.

Check-out coupons are printed at the check-out by a printer installed at the cash register. A computer analyzes the purchases made by each customer, and can print competitor's coupons or other coupons related to items in the current purchase. This system has a coupon redemption rate of approximately 9%.

The coupon industry expends a great deal of resources in market research, printing, issuing, distributing, and redeeming coupons, yet produces an extremely low redemption rate. This is attributed to the haphazard systems used by most consumers of manually clipping, filing, sorting through, and ultimately using the coupons, and to the high cost associated with targeting coupons to each consumer.

Attempts have been made in the prior art to meet the needs of the coupon industry and the consumer. U.S. Pat. No. 5,249,044 to Von Kohom describes a television-based coupon reception system wherein coupon information is transmitted along with program information to a broadcast audience. A member of the audience can generate a coupon for subsequent redemption at a store.

U.S. Pat. Nos. 5,285,278 and 5,287,181 to Holman also teach a television-based coupon reception system. Coupon information is encoded into a television broadcast signal and decoded at the consumer's television by circuitry similar to that used for closed-caption broadcast decoding. The extracted coupon information is then recorded on a medium such as a magnetic stripe card or a microprocessor-based "smart card". The user can then present the medium at the supermarket in order to automatically receive the appropriate discount.

U.S. Pat. No. 5,185,695 to Pruchniki discloses an electronic paperless coupon system which obviates the need for a paper coupon in order to save printing, processing, and clearinghouse costs as well as eliminating counterfeiting. Coupon redemption information is transmitted from a central system to local retailers, where coupon signs are placed near the related item. The discount is automatically applied at the point of sale without the need for the consumer to present a paper coupon.

U.S. Pat. No. 5,176,224 to Spector teaches a closed-loop coupon system which consists of a kiosk type printer station located at a retail store. The kiosk is linked to the manufacturer(s) in order to obtain specific coupon information. The consumer selects the desired coupon at the kiosk, and the coupon is printed and dispensed. The consumer presents the coupon at the register, where the discount is applied and the discount transaction data is transmitted back to the manufacturer.

U.S. Pat. No. 4,674,041 to Lemon et al. discloses a system with remotely located coupon printing stations capable of limiting the number of coupons printed in a given time period. Each coupon station has a display for indicating the available coupons, selection means to allow the consumer to choose the desired coupon, and coupon printer. The system disables display of a particular coupon when a preselected coupon limit has been reached.

While these aforementioned prior art attempts at providing couponing systems are useful in their own right, they fail to provide for a secure and interactive coupon generation system in which the user can request, select, store, manipulate, and print coupons as desired, in which user-specific information such as demographic data and data representative of those coupons so requested, selected, printed, and actually used may be provided back to the coupon issuer and distributor for more efficient coupon targeting in subsequent coupon issuance and distribution.

Readable images, such as bar codes, are used extensively for various purposes and in numerous applications. In particular, bar codes are used in transaction applications, such as in the redemption and tracking of coupons, wherein the bar code image represents one or more transaction data. Examples of transaction data represented by or encoded within bar codes are: redemption amount; expiration or term of offer; identity of coupon holder, issuer, redeemer, subject product or service; and many other pertinent or desirable information. Typically, in a coupon issuing or distribution system a particular document format is applied in universal or nearly universal fashion in which a predefined area is reserved or assigned for use in applying a bar code while other areas are reserved for other images or information. Often, electronic information representing the bar code image and the other reserved fields are transmitted or delivered to a station, typically a PC and connected printer, which has a built-in document generating module or program. The document generating module creates a desired document, such as a coupon, by applying the predefined document formatting rules to the received document information. The created document is then delivered to the attached printer for generating a printed document consistent with the document format and displaying the received document information, as well as other information that may be included within the formatting module.

Many techniques for printing bar codes are known. In general, bar code symbols are formed from bars or elements that are typically parallel alternating black and white rectangular stripes having a range of possible widths. The particular widths and order of the elements define the characters represented based on an established scheme or set of rules associated with a specified code or "symbology." The relative size of the bars and spaces is a function of the code. The bars and spaces, typically alternating spaces of black and white stripes, are of differing light reflecting characteristics. The number of characters per inch represented by the bar code symbol relates to the symbol's density. A collection of bars and elements is arranged in a complete bar code symbol sequence to encode a desired string of characters so as to form a decodable message. Each character of the message is represented by a corresponding group of bars and spaces. Also, a "start" and "stop" character may be included to indicate where the bar code begins and where it ends. These bar code schemes or symbologies include UPC, EAN, Code 39, Code 128, Codabar, and others.

Electro-optical scanning systems and CCD (charge coupled devices) code readers are used to scan and decode bar codes. Optical readers and scanning systems read bar code symbols from documents, labels, surfaces of articles, etc. The bar code symbol, as described above, is a coded pattern that collectively presents a graphic indicia. The optical readers and scanning systems transform the graphic indicia into decodable electrical signals that are descriptive of some article or subject. The digitized electrical signals are input to a data processing system, such as for point-of-sale processing, inventory management, mailing system management, etc.

Typical scanning systems have a detector or sensor which detects light reflected from the alternating bars and spaces that make up the bar code symbol. The systems are configured so that the detector is placed in an optical path having a field of view by which it can access the bar code symbols being presented for scanning. The reflected light patterns are detected and converted into electrical signals. A decoder receives the electrical signals and decodes the electrical signals into digital representations of the scanned character data. The analog electrical signal detected by the optical detector is converted into a PWM signal having widths that correspond to the physical widths of the graphical image or indicia. The signal is then decoded into a binary representation of the character data, and then to the alphanumeric character.

Some detectors utilize solid state imaging technology, e.g., charge coupled devices (CCDs), CMOS imagers, etc. In such solid state devices an array of multiple detectors is employed and is typically referred to individually as "pixels." The detector floods the bar code image with light from a light source or from ambient light to determine the presence of bars or spaces. A CCD reader employs an imaging lens and an image sensor, or a linear CCD array, and uses a scanning mirror for scanning, or a fixed mirror for manually scanning, the presented bar code image or graphic indicia.

Initially, with the scanning mirror in a fixed mode, the system outputs a beam of light which is aimed by the user to the center of the bar code image. Next, the scanning mirror rotates causing the light beam to scan the entire code. After scanning and acquiring the image, the CCD array generates an analog electrical signal representative of the scanned bar code. An analog to digital converter processes the electrical signal and generates a digital representation thereof. A bar code image discriminator may be used to identify the type of code.

Bar codes are particularly useful in that they permit electronic scanning and may be utilized in a variety of applications. Bar code scanners are known and are commercially available from sources such as Symbol Technologies, Inc. To facilitate scanning without errors and without requiring expensive scanners, it is generally desirable to print bar codes that are relatively large. In some applications the amount of space available for the bar code, and thus to at least a certain extent the maximum size of the bar code, is limited by other factors.

For example, bar codes may be used on coupons that are electronically downloaded by a consumer from a centralized source to a personal computer, wireless handheld device, mobile phone, PDA, kiosk or other terminal device and printed by an attached printer or other rendering device. Bar codes enable the coupons to be scanned when presented, when redeemed, or at other times. In at least some cases, the downloaded coupon may be formatted in a certain way, giving rise to limitations on the maximum size of a bar code imprinted therein. For example, a coupon template may specify an area for a UPC bar code, where the area may occupy a 3 inch wide region. If the coupon is being rendered by a printer, the size of the bar code will be primarily dictated by the space available (in this example a maximum width of 3 inches) and the resolution of the printer or other rendering device. For example a printer with a resolution of 150 dpi (dots per inch) could render the UPC bar code with a maximum of 450 dots (3 inches×150 dpi). Some bar codes, e.g., a UPC bar code, may have specifications that require a fixed integer resolution (e.g., a fixed number of pixels). For example, if a bar code has a width of 118 pixels, but the screen display area for the bar code is 450 pixels, certain drawbacks exist.

Printers, displays and other rendering devices are not of infinite resolution. Thus, such a device must anti-alias or adjust an image when it scales the image. Thus the lines may not exactly align with the pixels of a printer or other rendering device. As a result, inaccuracies in the desired proportions exist. This can lead to scanning errors.

Past attempts to maximize the size of the UPC bar code in this example would result in some form of anti-aliasing, interpolation or other technique to "spread" the 118 units over 450 pixels. This leads to various problems, including at least some lines of the bar code being grainy or blurry. This can lead to scanning errors. This is an undesirable drawback.

One object of the invention is to overcome these and other drawbacks of existing systems and methods.

One object of the invention is to avoid inaccuracies in the proportions of the lines of a bar code when "stretching" or scaling the bar code, such as caused by aliasing techniques.

In addition to the foregoing, it is an object of the present invention to provide such a coupon distribution system which overcomes the aforementioned problems and shortcomings of the prior art.

It is an object of the present invention to provide an electronic coupon distribution system which can be easily accessed by masses of consumers by using a readily available personal computer rather than needing to purchase special-purpose equipment.

It is a further object of the present invention to provide such an electronic coupon distribution system which allows a user to request transmission of coupon data and select, store, manipulate, and print coupons from such coupon data.

It is a further object of the present invention to provide such an electronic coupon distribution system which allows the coupon issuing companies to access valuable information directly from the consumer without requiring specific and additional action by the consumer, but rather by using the information from the user's personal computer regarding the consumer's selection, printing, and actual redemption of coupons, as well as responses to demographic queries posed to the users.

It is a further object of the present invention to provide such an electronic coupon distribution system which allows a consumer to generate shopping lists associated with coupons selected and printed, in order to simplify the shopping process and promote the use of product coupons.

It is a further object of the present invention to provide such an electronic coupon distribution system which allows for automatic deletion of expired coupons in the user's computer database and the modification of redemption amounts of coupons in the user's database, both of which can be transparent to the user.

It is a still further object of the present invention to provide a secure coupon system which generates unique coupons with user-identifying data and allows the printing of a coupon only once, thus eliminating the possibility of fraud by both the consumer and the retailer.

It is a still further object of the invention to provide an efficient, low cost, zipcode/lifestyle/lifestage or household targeted coupon distribution system to tailor the incentives to each user.

SUMMARY OF THE INVENTION

Readable images, such as bar codes, are used extensively for various purposes and in numerous applications. In particular, bar codes are used in transaction applications, such as in the redemption and tracking of coupons, wherein the bar code image represents one or more transaction data. Examples of transaction data represented by or encoded within bar codes used in coupons, incentives or other such documents include: redemption amount; expiration or term of offer; identity of coupon holder, issuer, redeemer, subject product or service; and many other pertinent or desirable information. In a coupon issuing or distribution system of the present invention a predefined document format is applied in a universal or nearly universal fashion in which a predefined area is reserved or assigned for use in applying a bar code while other areas are reserved for other images or information. Often, electronic information representing the bar code image and the other reserved fields are transmitted or delivered to a station, typically a PC and connected printer, which has a built-in document generating module or program.

The document generating module creates a desired document, such as a coupon, by applying the predefined document formatting rules to the received document information. The created document is then delivered to the attached station printer for generating a printed document that is consistent with the document format and that displays the received document information, as well as other fixed information that may be included within the formatting module. Where a plurality of remote users access and print coupons from a variety of remote station configurations having a variety of printer types, the particular resolution associated with each such printer type may vary widely.

In accordance with the above stated objects, as well as others, The bar code rendering system of the present invention addresses such objects by various embodiments discussed herein. According to one embodiment of the invention, the system detects the resolution of the printer or other rendering device and optimizes the scale of the bar code so that the bar code lines and pixels perfectly align to avoid blurry or grainy lines. In this manner, the bar codes are always the theoretical ideal of a scalable bar code, a whole integer multiple of the available pixel "bandwidth." Device resolution is typically quantified based on the picture element unit "pixels."

A pixel is the smallest resolvable rectangular area of an image, either on a screen or stored in memory. Each pixel in a monochrome image has its own brightness, from 0 for black to a maximum value, e.g., 255 for an eight-bit pixel, for white. In a color image, each pixel has its own brightness and color, usually represented as a triple of red, green and blue intensities. For purposes of the disclosure of the embodiments provided herein the description is limited to monochrome images, however it should be understood that the present invention fully contemplates other images, including color images. Inaccuracies arise when the pixel width of a bar code image does not match or align with the available pixels in a defined width based on a given printer's resolution.

For example, if a bar code is 118 pixel units wide, and only 450 pixels are available on the printer, the system will not attempt to stretch the bar code image to 450 pixels. Rather, the system will only use the greatest whole number multiple of the number of required pixels less than the total number of available pixels and center the image in the total available pixels. For the example above, the system will scale the bar code to 354 pixels (3 times the 118 pixel requirement) and center those 354 pixels in the 450 pixels. If however, the coupon were being rendered on a printer with a resolution of 500 dpi, the UPC bar code could be scaled to 472 pixels. Because the system uses whole integer scaling, the available pixels align with the bar code pixel bandwidth. An analogy would be to describe the bar code and the printer map as being in tune at a particular frequency, the whole integer one being the fundamental frequency and the whole numbers greater than one being harmonic frequencies of the fundamental frequency.

This is a significant advance over the prior art methods of rendering bar codes which effectively "stretched" the image to fit the available space without regard for aligning the pixel maps of the bar code and the printer. Using the example of a 118 pixel width bar code and a printer area width of 450 pixels, one method of the prior art would stretch the bar code image to fit the entire available printer area. In this manner, the stretching factor is 3.813, which is 450 divided by 118, and the misalignment factor is 4.6875, which is 450 divided by 96, the remainder of 450–354. Accordingly, every fourth or fifth pixel column along the entire width of the available printer area will not align with the bar code and where adjacent information is not identical, then the rendering system "guesses" or interpolates the information to assign to that pixel column. In dealing with adjacent black and white stripes of bar code images, there are three typical methods of interpolating such data and generating print data: 1) average the data by creating a "gray" pixel column, really an array of spaced apart black dots on a white background; 2) randomly or pseudo-randomly assign the entire column as black; and 3) randomly or pseudo-randomly assign the entire column as white. Each of these "interpolations" will result in blurry hard to read images or inaccurate renderings caused by arbitrary pixel print information.

In addition to the foregoing, and in accordance with still other objects, provided is a system for distributing and generating at a remote site product redemption coupons comprising centrally located repository of electronically stored product redemption coupon data, transmission means operatively associated with said centrally located repository for providing data communication between said repository and a plurality of remote user computers, and a remote user computer operatively associated with said transmission means. The remote user computer in the present invention comprises interface means for providing user interaction with the centrally located repository, a memory, and a coupon data management program. The coupon data management program is implemented by the computer for requesting coupon data from the centrally located repository, for storing in the memory coupon data transmitted from the centrally located repository, and for generating printable coupon data from the stored coupon data. The remote user computer also comprises a coupon output buffer operatively associated with the data management program for storing the printable coupon data generated by said coupon data management program.

The present invention additionally comprises a printer for printing product redemption coupons from the printable coupon data stored in the coupon output buffer. Alternatively, the system may enable the user to transmit electronically the printable coupon data from the coupon output buffer to the centrally located repository or directly to the retailer for electronic coupon redemption.

As a result of the present invention, a user of the remote computer is able to request coupon data to be transmitted from said centrally located repository, and the user is able to instruct his computer to print or electronically transfer product redemption coupons generated from the transmitted coupon data. In particular, the user's computer assembles product redemption coupons for printing by using two data components; (1) fixed coupon data which is transmitted to the user's computer during an initialization or "sign-up" process and which remains stored on the user's computer for subsequent coupon generation, and (2) variable coupon data which is transmitted to the user's computer whenever he requests coupon data from the central repository.

Additionally, the coupon data management program of the present invention operates in conjunction with the remote computer to allow the user to select and store certain desired coupon data from the coupon data transmitted by the centrally located repository and print coupons as selected. The coupon data management program also allows the user to generate a shopping list which is correlated to the coupons printed for subsequent redemption.

In the present invention, the data exchange capabilities provided by the transmission medium between the remote computer and the central repository allow the automatic transfer of valuable information from the remote computer to the central repository and, ultimately, to the coupon distributing and issuing centers. Information related to the coupons selected and printed can be supplied to the coupon distributors and issuers, which can also use information obtained from the various retail stores as to which coupons were actually redeemed in order to more intelligently market subsequent coupons and target coupon issuance in a more cost effective manner.

The data exchange capabilities are further advantageously utilized in the present invention to allow, via the central repository, the updating of coupon data stored in the user's remote computer without required interaction from the user if the user is online. In particular, the central repository can delete expired coupons from the remote computer's coupon database and can vary the amount of redemption value of a non-expired coupon if so desired. The capability for the updating and deleting of coupons within a user's computer is programmed in the user's computer such that no further interaction with the central repository is required for such coupons to be deleted or updated.

Finally, the present invention provides for secure coupon generation by allowing the printing of a particular coupon only once. Further, and quite importantly, the present invention provides for the printing on each coupon of certain user-specific data, thus making each coupon printed unique. Thus, two different users with access to printing a particular coupon will each print coupons with the same product, discount, and expiration date data, yet each will be unique since printed thereon will be user-specific data, preferably in the form of a user-specific bar code. Thus, any attempts to duplicate via photocopying techniques any particular coupon will be discouraged since the coupon redemption center will detect when a particular coupon has been redeemed, will identify the user who redeems a particular coupon, and will disallow any attempt at redemption of a second coupon with identical product and user-specific data.

BRIEF DESCRIPTION OF THE DRAWING

FIG. 3 illustrates exemplary data field formats of the electronic coupon data as implemented in the present invention.

FIGS. 4a and 4b are pictorial representations of the online and offline display screens, respectively, which are exhibited to a user in the present invention.

FIG. 11a is an example of a bar code image having a pixel width of 2.

FIG. 11b is an example of the bar code of FIG. 11a after being stretched to fit a print area width of 3 pixels by a first prior art bar code rendering technique.

FIG. 11c is an example of the bar code of FIG. 11a after being stretched to fit a print area width of 3 pixels by a second prior art bar code rendering technique FIG. 11d is an example of the bar code of FIG. 11a after being stretched to fit a print area width of 3 pixels by a prior art bar code rendering technique.

FIG. 11e is an example of how the bar code of FIG. 11a should appear after being stretched to fit a print area width of 3 pixels.

FIG. 12 is a schematic block diagram illustrating a distributed network employing the bar code rendering technique of the present invention.

DETAILED DESCRIPTION OF INVENTION

Figure 1:
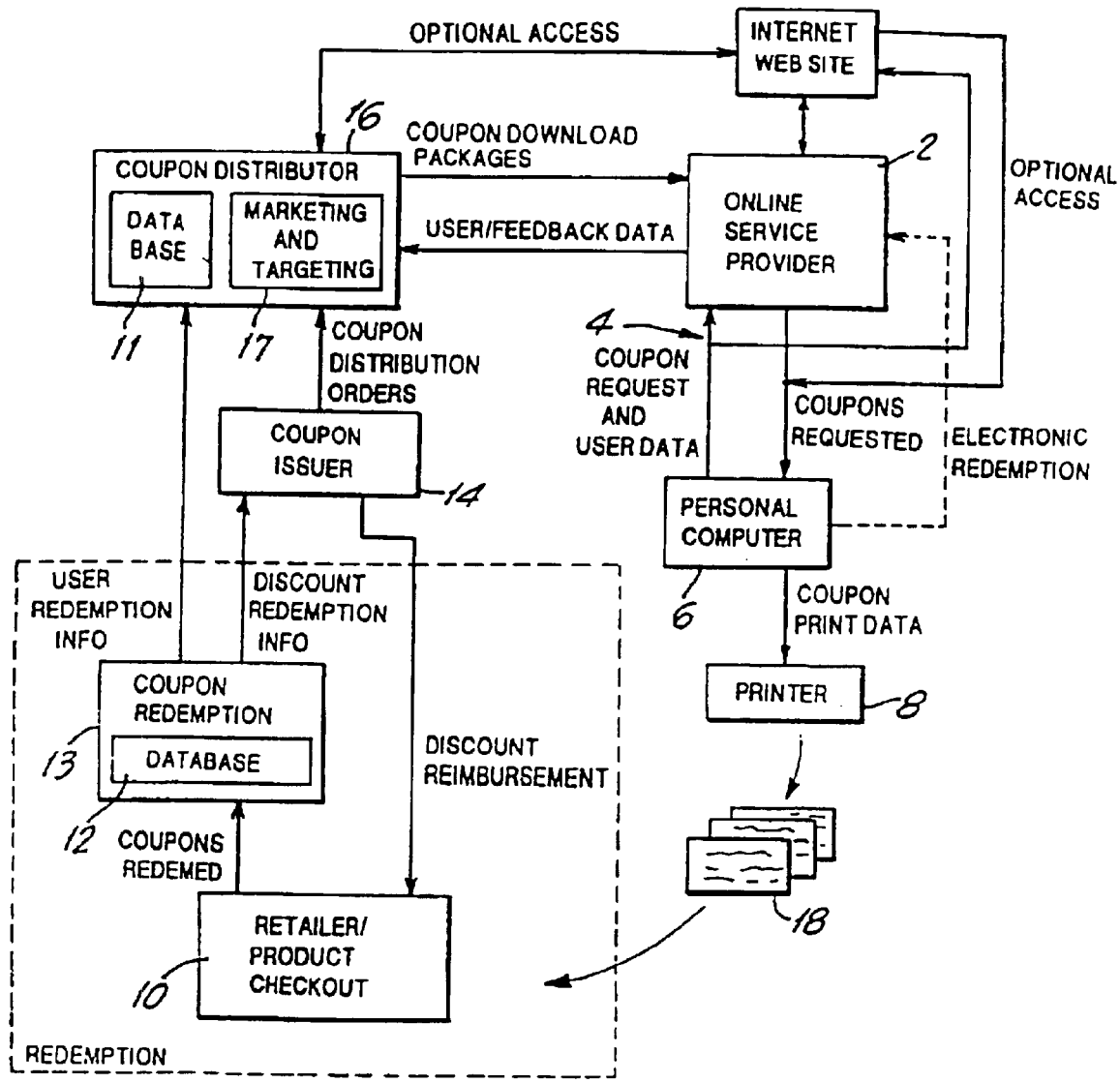
FIG. 1 is a block diagram schematic of the system of the preferred embodiment for the electronic distribution of coupons.
Figure 8:
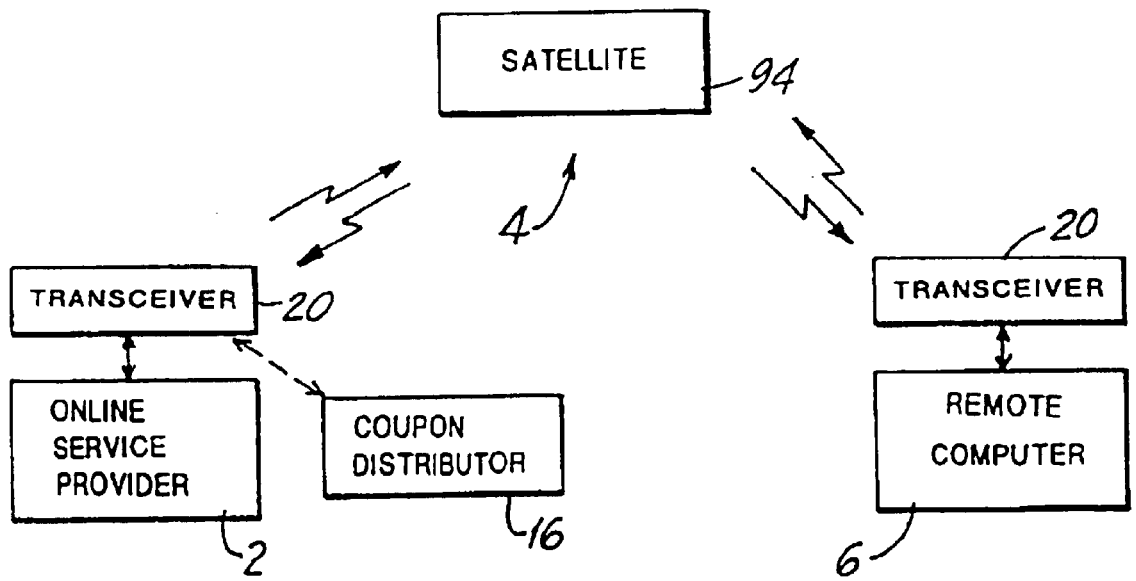
FIG. 8 is a block diagram of an illustrative embodiment of the present invention in which data is transmitted between the central repository and personal computer by satellite.
Figure 9:
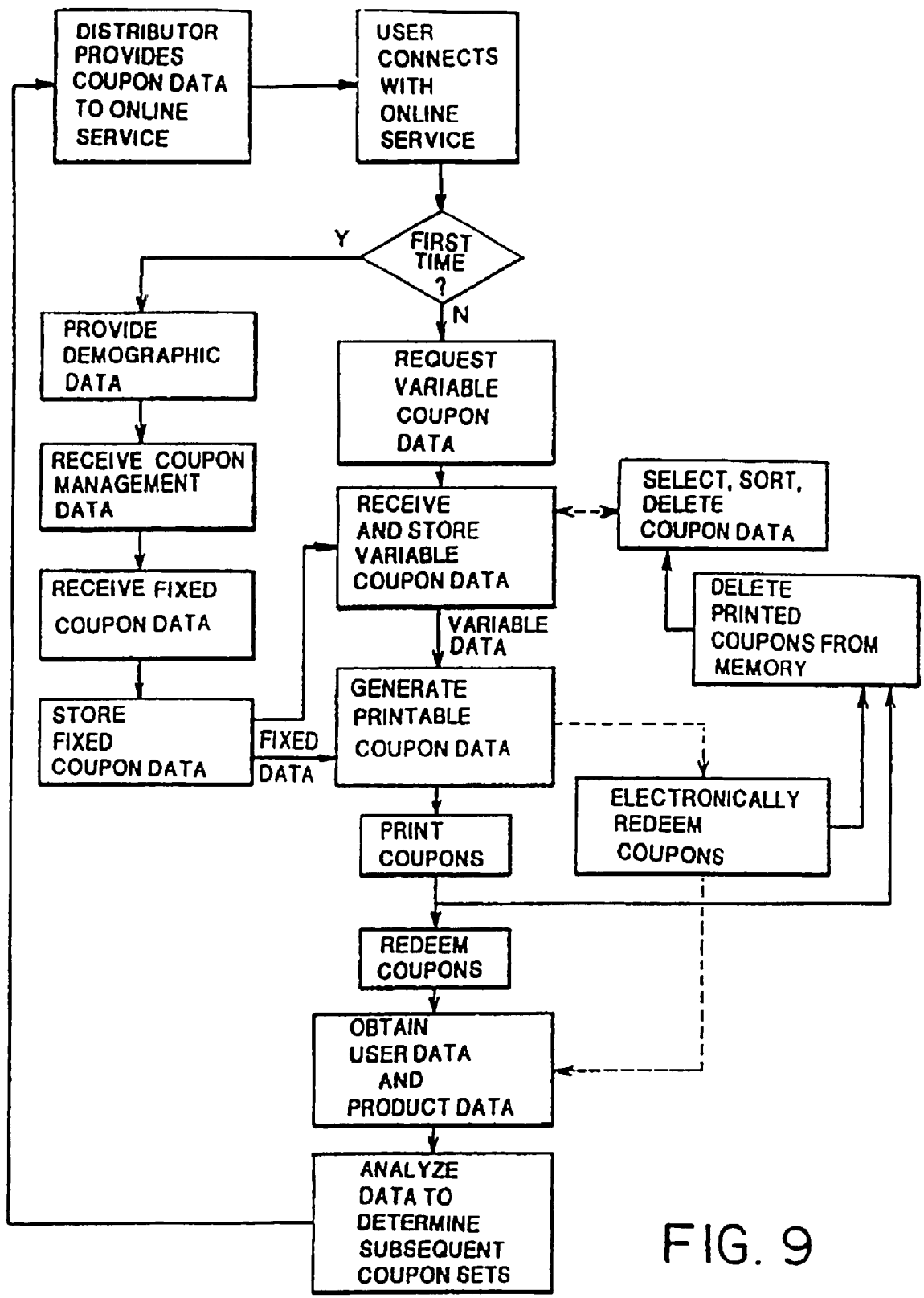
FIG. 9 is a flowchart of the operation of the present invention.

Referring to the system block diagram of FIG. 1 and the flowchart of FIG. 9, the electronic coupon distribution system of the preferred embodiment comprises a central located repository of electronically stored coupon data, which in the preferred embodiment is an online service provider 2. The term online service provider refers herein to any computer-based information service provider which is accessible by a remote personal computer user via a communications data link such as the public switched telephone network (PSTN) or the like, such as PRODIGY, COMPUSERVE, or AMERICA ONLINE. In addition, it is contemplated that the electronic coupon data distribution may be carried out by connection to any readily accessible Internet such as the World Wide Web. Referring to FIG. 8, it is further contemplated that electronic coupon distribution may also be carried out via digital satellite communication links, thus avoiding the need for hardwired (i.e., PSTN) connectivity between the repository and the remote user computer. Thus, any centrally located computer system which is accessible to the public by any transmission means is contemplated as being within the scope of this invention. As used herein, the term "user" denotes an individual user or a household of users linked through one account.

The online service provider has stored in its database 40 (see FIGS. 6 and 10) various packages of electronic coupon data, the content of which will be further described below. The electronic coupon data is provided, by a coupon distributor 16 or coupon issuer 14, by any if various means such as electronic transmission via the PSTN or satellite data exchange. The online service provider also stores in a demographic data file 42 user-specific data, including coupons selected data, coupons deleted data, coupons printed data and user demographics, as will be described below, for subsequent transmission to a coupon distributor 16. The coupon distributor 16 will utilize the user-specific data and coupon redemption data in compiling subsequent coupon packages targeted specifically at certain user categories.

Figure 2:
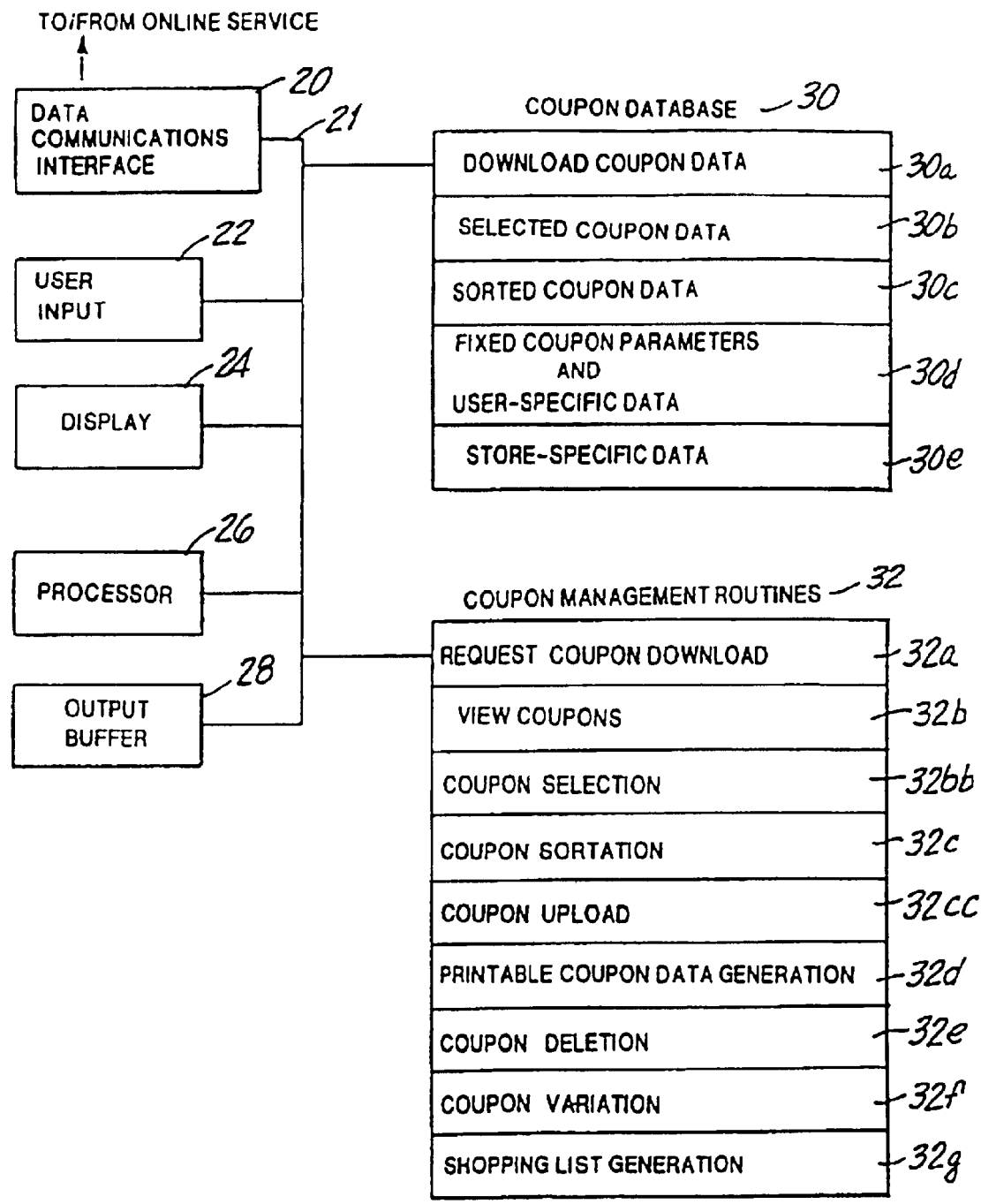
FIG. 2 is a detailed block diagram of the remote personal computer of FIG. 1 configured in accordance with the present invention.

The online service provider 2 is connected with the data link 4 and is, thus, accessible by any remote personal computer 6 having a data communications interface 20 such as a modem (see FIG. 2). The online service provider communicates with the personal computer 6 in order to transmit requested coupon data, and also in order to receive coupon requests and the user-specific data mentioned above.

The remote personal computer 6 has connected thereto a printer 8, which may be any type of computer printer capable of printing graphics. The printer 8 is instructed by the coupon data management routines 32 stored in the computer 6 in order to print printed coupons 18, as will be described in detail below.

The printed coupons 18 are used in the normal fashion by a consumer when shopping at a desired retail store 10. That is, the coupons 18 are presented to a product checkout station 11 along with the associated products for purchase, and the discount amount shown on the coupon 18 is credited to the consumer at the point of sale. The redeemed coupons 18 are transmitted to a coupon redemption center 13 where they are electronically read, and user-specific data is stored in a coupon redemption database 12.

Figure 5:
FIG. 5 is a diagram of a printed coupon resulting from the electronic distribution in accordance with the present invention.

In addition to the usual coupon information found in prior art coupons (e.g., redemption amount, company and product name, expiration date, etc.), the coupons 18 of the preferred embodiment of the present invention contain user-specific data in the form of a unique user bar code 90, as shown graphically in FIG. 5. The user bar code 90 is encoded with user-specific information such as the user name and/or other unique identification criteria such as a social security number or online service address. This information renders each printed coupon 18 unique, since an otherwise similar coupon presented by a different consumer will comprise a different user bar code 90. The use of a unique coupon 18 is but one aspect of the secure nature of the present invention as will be described in detail below.

The coupon redemption center 13 receives from a number of stores 10 the coupons redeemed, verifies the value of the redeemed coupons, determines the identification of the users who redeemed the coupons, and distributes the information read from the coupons 18 to the individual coupon issuer 14 and to the coupon distributor 16. In particular, information regarding the redemption amount and the redeeming store 10 is forwarded to the particular coupon issuer 14 named on the coupon 18, which then credits the redeeming store 10 with the total amount of discounts given. Of particular value in the present invention is the distribution of user-specific data to the coupon distribution center 16, which collates such user information and performs marketing analysis via a marketing analysis means 17 in order to compile subsequent coupon packages targeted specifically at certain user categories. The coupon distribution center 16 utilizes the user-specific redemption data along with user-specific demographic data supplied by the online service provider 2 in order to compile subsequent coupon data download packages for use by consumers once again.

An online display screen 60 is shown in FIG. 4*a*, which is provided to a user on a display 24 of his remote computer 6 whenever he is in online communication with the service provider 2. The online display screen 60 comprises a join service function button 62, a download coupons function button 64, a help function button 66, and an online communications button 68. When the user desires to initially register for the electronic coupon distribution service, he selects the join service function button 62 which initiates a dialog with the online service provider 2 in order to request certain demographic data from the user which will be used to target specific coupon data packages for subsequent downloading. The user has the option of providing the requested information if he so desires. In addition, an offline coupon management program is transmitted electronically to the user's computer 6 for subsequent coupon data requesting, downloading and processing.

Figure 6:
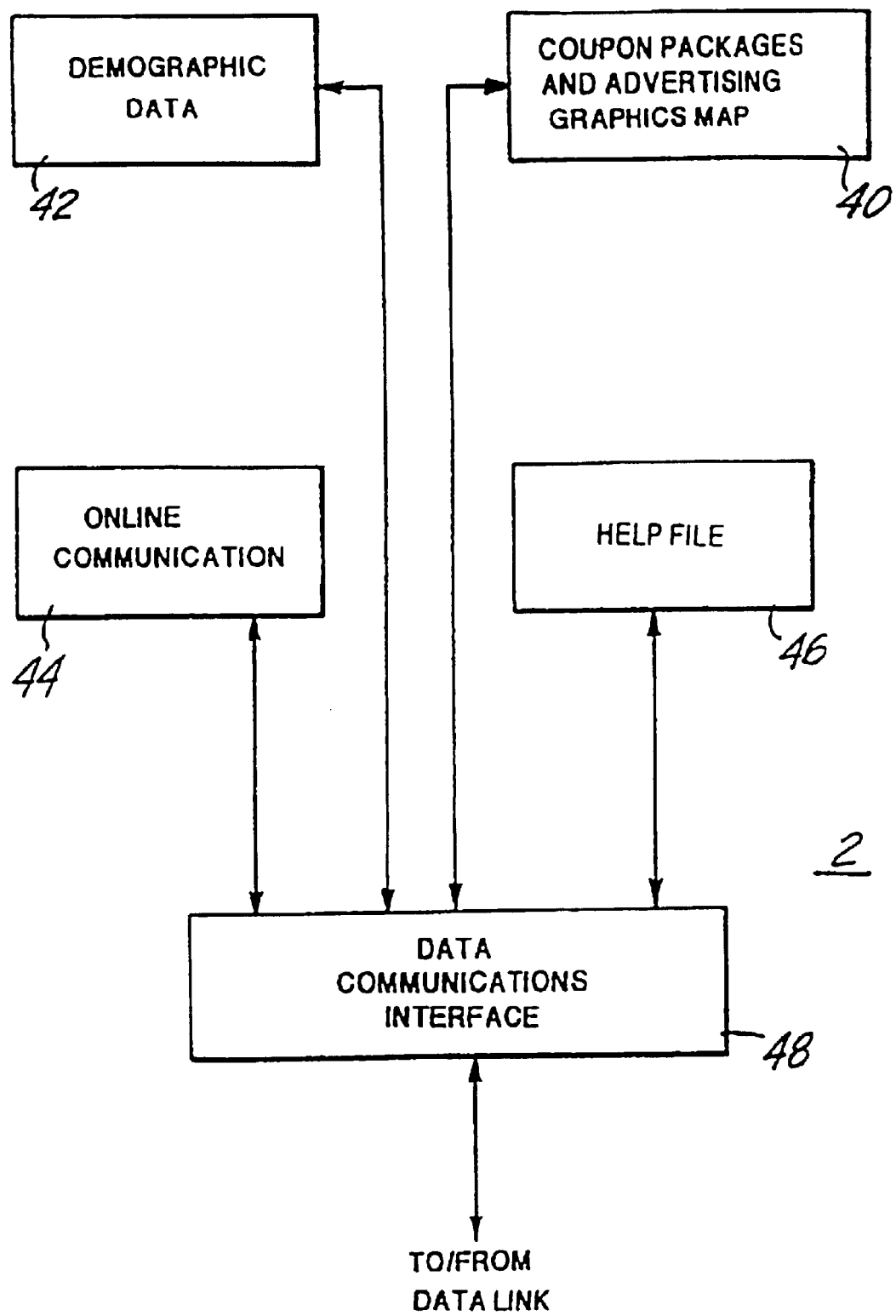
FIG. 6 is a schematic block diagram illustrating the main functional areas serviced by the online service provider of the preferred embodiment system.

FIG. 6 illustrates the functional aspects of the online service provider 2 in the preferred embodiment of the present invention. The main features provided by the online service provider 2 are the coupon packages file 40, the demographic data file 42, the online communications server 44, and the help file 46. Each of the aforementioned features communicates with the user via the data communications interface 48.

The coupon packages file 40 comprises electronic coupon data and other types of advertising materials supplied by the various coupon issuers 14 through the coupon distributor 16. Individual users' coupon data packages are drawn from this file based on demographic data and historic buying profiles stored in the demographic data file 42. Advertisements may consist of graphics, text, recipes, competitions, or other inducements or a combination thereof.

After joining the electronic coupon service, the user can order a package of electronic coupons from the online service provider 2 by selecting the download coupon function button 64. When this button is selected, commands are generated and transmitted via the data communications interface 20, through the data link 4, and up to the coupon package file 40 resident at the online service provider 2. The requested coupon data package and associated advertising materials are transmitted by the online service provider 2 to the personal computer 6, where it is stored in the downloaded coupon data file 30*a* in the coupon database 30.

The demographic data file 42 contains data representative of demographic inquiries presented to a user at the time that the user requests a download of a coupon data from the coupon package data file 40, as well as data representative of the users' responses thereto.

The online communication server 44 is accessed by the user selecting the online communication button 68. The online communication server is a bulletin board type file where users can post messages to a coupon distributor or issuer regarding any issue of interest. The message data is transferred to the appropriate destination by the online service provider 2, which also collects the responses thereto and posts them on the online communication server 44, thus allowing the user to fetch the response when logged on at a subsequent time.

By selecting the help function button 66, the help file 46 is used as a means for providing standard help and other useful information to a user.

Referring to FIG. 2, the remote personal computer 6 of the preferred embodiment comprises a data communications interface 20 (such as a modem) for connecting the computer to the data link 4 (such as a PSTN), a user input device 22 such as a keyboard and mouse or other type pointing device, a display 24, and a processor 26, all of which are common to personal computers and are well known in the art. The computer 6 also comprises an output buffer 28, which typically resides in random access memory. The computer 6 is configured to operate in accordance with the present invention via a coupon database file 30 and an offline coupon data management routine file 32 loaded onto fixed memory such as a hard disk drive. All of these internal components and files are connected to a data bus 21 for communication therebetween in accordance with techniques well known in the art.

The coupon database file 30 is segmented into various sections as shown in the memory map of FIG. 2. The coupon database of the preferred embodiment comprises downloaded coupon data 30a, which is the entire coupon data package downloaded from the online service provider 2; selected coupon data 30b, which is a subset of the downloaded data and represents specific coupons electronically "clipped" and stored therein; sorted coupon data 30c, which is selected coupon data sorted in accordance with a particular set of criteria (e.g., all fruits together, then all dairy products, etc.); fixed coupon parameters and user-specific data 30d, which is certain unvarying data used in printing the coupons as will be described in detail below; and store-specific data 30e, which is information regarding the product arrangement in a certain retail store 10 which will allow the user to prepare a shopping list tailored to the particular store.

The offline coupon data management routines 32 are executed by the processor 26 in conjunction with the coupon database 30 in order to request, obtain, store, select, sort, and print coupons as desired. The offline coupon data management routines 32 are executed by selecting a desired function button 52, 54, 56, or 58 as shown in the offline display screen 50 in FIG. 4b. The offline display screen 50 is shown on the display 24 when the user runs the coupon data management program on his or her personal computer 6. The offline coupon data management routines 32 are executed in an offline fashion; that is, the user does not need to first be in online communication with the service provider 2. If a particular function button 52, 54, 56, or 58 chosen by the user initiates a routine 32 which requires online communication, that routine will initiate, control, and terminate an online session with the service provider 2 automatically.

The request coupon download routine 32a is executed when the user desires to order a package of electronic coupons from the online service provider 2. This routine is called when the user selects the download coupon function button 54. When this routine is called, commands generated by this routine are transmitted via the data communications interface 20, through the data link 4, and up to the coupon package file 40 resident at the online service provider 2. The requested coupon data package and associated advertising materials are transmitted by the online service provider 2 to the personal computer 6, where it is stored in the downloaded coupon data file 30a in the coupon database 30.

Prior to downloading the requested coupon data package to the computer 6, the demographic data file 42 provides certain demographic queries to the user in order to obtain valuable information for use in marketing analysis and subsequent coupon package generation. The users' responses to the queries are transmitted to the online service provider 2 and stored in the demographic data file 42 for subsequent processing.

The user may select the view function button 52 in order to view the coupons and advertisements previously downloaded. This selection will call the view coupons routine 32b, which will access the downloaded coupon data file 30a and present it to the user via the display 24.

While viewing the coupons and advertisement, the use may select a desired coupon for further sorting, storage, printing or deleting and/or shopping list generation by selecting or "clipping" the coupon with the mouse or keyboard input 22. Coupons are clipped by scrolling through related advertisements. In order to avoid the need for clipping, the user may print or delete a desired coupon. The coupons selected in this function are stored for further processing in the selected coupon data file 30b.

The coupon file function button 56 enables the user to perform several operations on his selected coupon data file 30b. The user may view the coupons selected (from the selected coupon data file 30b), and may choose any of them for printing. Further, a sortation option is provided which logically sorts, by category and subcategory, the coupons stored. Thus, the management program automatically places all the dairy coupons together, and may also place all the milk coupons together within the dairy category. This is carried out by the coupon sortation routine 32c, and is akin to the manual filing system used in the prior art and will aid the user in viewing his selected but unprinted coupons in an efficient manner. The sorted coupons may be loaded into the sorted coupon data file 30c for subsequent viewing and printing. The user may optionally sort the coupons manually by his own classification.

The shopping list function button 58 calls the shopping list generation routine 32g when selected by the user. This routine will allow the user to generate a list from a menu presented on the screen whichever items the user desires to purchase, and the user can store and/or print this list as desired. The items on the list are compared against coupon data stored in the coupon database 30 and the user is informed of their existence. The user may then print out those coupons along with the shopping list. Alternatively, the user may select certain coupons for printing, and the item associated therewith is automatically placed on the shopping list. Thus, in either fashion, the user's shopping list generation and coupon "clipping" tasks are conveniently merged in a timesaving manner.

The shopping list generation routine 32g may also advantageously use data stored in the store-specific data file 30e in order to prepare a shopping list tailored to an individual retail store. Thus, data regarding the layout of the store, the food items available at the store, and the like, are used by the list generation routine 32g in order to organize the purchase items accordingly. The data stored in the store-specific data file 30e may be obtained by any of several methods; by downloading from the online service provider 2, by inputting via a floppy disk memory supplied by the store, or even manually input by the user. Data for different stores can be kept in the file 30e and the user simply selects the store he intends on using at that particular time. The user may select a standard pre-programmed shopping list, his last generated shopping list, or a blank shopping list from which to commence his shopping list preparation.

The coupon upload routine 32cc is called automatically and without user request whenever user requests a coupon download package from the online service provider 2. A record is kept by the upload routine 32cc indicative of each coupon selected by the user and each coupon printed by the user. This record is sent to the demographic data file 42 in the online service provider 2, and is used for marketing analysis along with data regarding which coupons were actually redeemed, which information is obtained from the manufacturers' redemption agency or center.

Coupons are printed by the printable coupon data generation routine 32d, which is invoked by a user when he selects a print command from the coupon file function 56. This routine obtains data from two sources in the coupon database 30: the fixed coupon parameters and user-specific data file 30d, and the variable coupon data associated with the particular coupon selected for printing.

Referring to FIG. 3, the data format of the fixed coupon parameters and user-specific data are set forth and include predefined border graphics which are the same for every coupon printed, redemption instructions, and a user identification bar code number. The user identification bar code number is a unique number assigned to that user, e.g. his social security number or online identification number. This number will be encoded by the printable coupon data generation routine 32d and printed as a bar code 90 on each coupon 18 printed for the particular user. This information will thus be obtained by the coupon redemption center and provided to the coupon distributor 16 for demographic analysis and the like.

The unique user bar code 90 also renders the electronic coupon system of the present invention secure and virtually fraud-proof. Although a user is able to print out a particular coupon 18 only once (to be described in detail below), the coupon issuer 14 could still be defrauded by a user or retailer who might photocopy a printed coupon numerous times and fraudulently and repeatedly present it for redemption. However, in accordance with the present invention, each coupon printed by a user is unique, and the scanning of a coupon presented for redemption will be stored at the coupon redemption center. Thus, the coupon issuer will know if a particular user has redeemed a particular coupon and thus disallow further redemption of a photocopied coupon bearing the same indicia.

Referring again to FIG. 3, the data format of the variable coupon parameters are set forth and include the coupon expiration date, the redemption amount, the company and product information, the UPC code, the redemption address, and the description of the coupon offer.

Thus, the printable coupon data generation routine 32d combines all this information and generates a record indicative of the unique coupon to be printed. This record is temporarily stored in the output buffer 28, where it is subsequently sent to the printer 8 for printing. In the alternative, the coupon may be redeemed electronically by sending the coupon data in the output buffer via the data communications interface 20 back to the online service provider 2. This is especially useful in the "electronic shopping mall" environment now found in many online services. The electronic coupon data could also be routed via the data communications interface 20 to a retail store where the user will be shopping, where the coupon data is held in a buffer pending purchase by the user of the matching product.

As described above, the electronic coupon distribution system of the present invention allows the printing of a particular coupon only once, thus providing for security and guarding against fraudulent redemption. This is accomplished by the coupon deletion routine 32e, which is called whenever a coupon is printed and deletes the coupon from the database 30 or renders it unprintable by setting an appropriate flag. In addition, the coupon deletion routine 32e allows for automatic deletion of expired coupons by periodically checking the expiration date field of each coupon against a real-time clock found in the computer 6. Optionally, the user may voluntarily delete any coupon which is expired if the real-time clock is not set to the correct date. For the user's convenience, the online service provider 2 can check the system clock of the user's computer 6 during a communications session and, if the date is incorrect, can ask the user if he would like the date adjusted automatically.

Since the actual expiration date is always printed as part of the coupon, the function of deleting expired coupon data from the user's computer 6 is for the convenience of the user rather than for security purposes.

The system of the present invention also allows for time-sensitive deletion of certain coupon data from the user computer 6 which is unrelated to the expiration date. That is, certain coupon data may be automatically deleted from the user's computer after, e.g., one month, notwithstanding that the coupon, if printed, might have an expiration date in six months. This feature is included to prompt users who know of the time-sensitive autodeletion to promptly print (and use) coupons rather than risk having them deleted from their database.

The coupon management program also can vary the redemption value of any coupon already downloaded to the user's computer 6 without the need for specific user interaction. A coupon variation routine 32f is called which aids in this task. Again, any time that a user initiates a download of coupon data, the on-line service provider 2 can update redemption amounts for coupons whose issuers have decided to change the discount amount.

Referring to FIG. 5, the secure coupon 70 generated and printed in the preferred embodiment is illustrated in detail. The secure coupon 70 comprises the following fixed components taken from the fixed coupon parameter and user-specific data file 30d: border graphics 72, redemption instructions 88, and user identification bar code 90. The secure coupon 70 also comprises the following variable components which change for each coupon selected: expiration date 78, redemption amount 74, description of the offer 76, company and/or product information 80, the item's UPC number 82, and the associated UPC bar code 84, and the redemption address 86.

Figure 10:
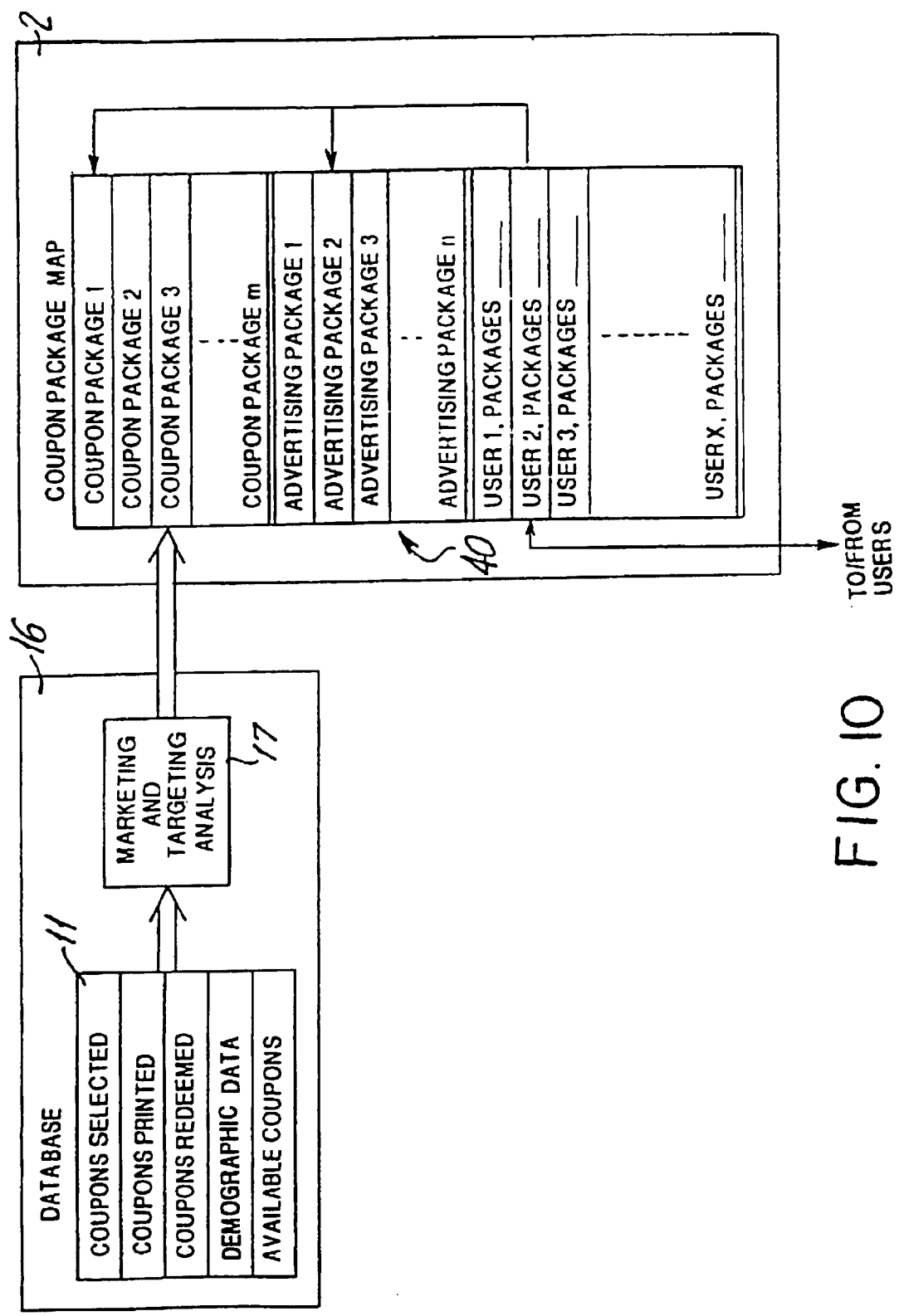
FIG. 10 is a schematic block diagram of the implementation of the coupon data package generation.

Referring to FIG. 10, the generation of coupon data packages by the coupon distributor 16 will be explained. The information collected by the coupon distributor 16 from the online service provider 2 regarding the coupon data selected by the user, the coupon data printed by the user, and the requested demographic information is stored in a database 11. The database 11 also stores information from the coupon redemption center 13 regarding the coupons actually redeemed by the user. The database 11 further stores information regarding all coupons which are made available by the various coupon issuers 14 from which it will generate coupon data packages for subsequent downloading to users.

The information stored in the database 11 is input to the marketing and targeting analysis means 17, which carries out the function of analyzing the aforementioned information in a manner known in the art to arrive at different coupon packages. That is, it may be determined by the analysis means 17 that users with dogs in their household (which is known by the demographic responses) will get a certain package comprising dog food coupons. It may be further determined that users who select, print, and redeem dog food coupons of Brand X will get coupons issued by Brand Y, or will get only low value coupons since they are already dog food coupon users, etc. That is, depending on the marketing and targeting criteria and objectives, the analysis means will generate coupon packages as desired.

Thus, the analysis means generates a number of differing coupon data packages for transmittal to the online service provider 2. The analysis means also provides specific mapping information which will instruct the online service provider as to which user should be provided with which package(s). For example, user 1 may be mapped to coupon data packages 2 and 3; user no. 2 to packages 3 and 6, etc. This mapping function may be carried out by the coupon distributor and provided to the online service provider at regular intervals, e.g. once per week. Thus, the coupon selection, printing and redemption habits may be analyzed over a time period and used to determine the subsequent targeted packages.

In addition to mapping certain coupon data packages to certain users, certain advertising packages may be mapped to the users in a similar fashion.

In accordance with the present invention, the marketing analysis, coupon packaging, and coupon package distribution functions carried out by the coupon distributor 16 may be carried out at the central data repository, i.e. Internet web site. Further, the coupon redemption and user redemption information processing functions individually carried out by the coupon redemption center 13 and the individual retail stores 10 may be combined into a single redemption center, as shown by the dotted line in FIG. 1. The physical layout of the functions within the system of the present invention is a matter of practicality and choice of the systems designer and does not impact the utility of the present invention.

Figure 7:
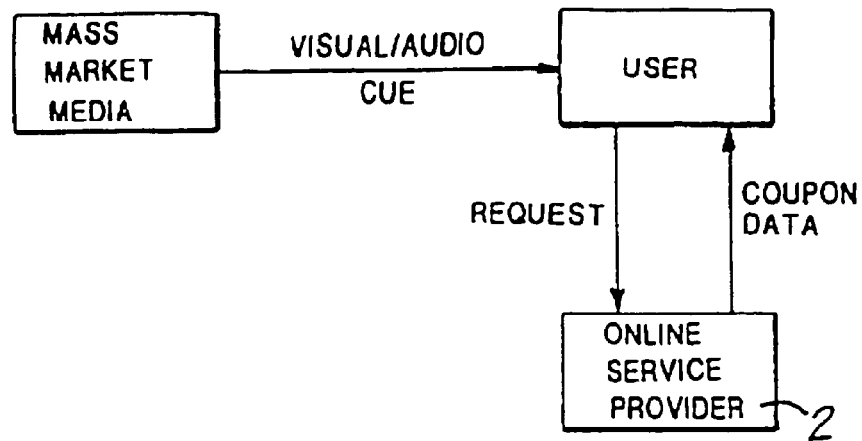
FIG. 7 is a diagram of the use of an external cue to prompt access by the user of the system.

In an alternative embodiment of the present invention, the user is provided with a visual or auditory stimulus or cue to suggest an access of the electronic coupon distribution system. Referring to FIG. 7, a message or logo may be included along with the advertising material normally provided on television, in the newspapers, and the like. This will indicate to a user that he should access the online service provider 2 in order to obtain coupon data related to the advertised product. The availability of the coupon could be time-sensitive, which would provide further incentive to the user to use the system in a prompt and efficient manner. When the radio media is used, a tonal or spoken cue may be included during the advertising message to accomplish the same result.

The amount of redemption discount included with a coupon downloaded to a user may be varied depending on certain demographic information that the system has about the user. For instance, the system may provide a certain value for known users of a brand (which information it will obtain by demographic inquiry or through previous redemptions in the system), and it may provide a higher discount in order to provide an incentive to users of a competitive brand. The ability to vary the value of a discount offer in accordance with such demographic and usage data is a unique advantage offered by the system of the present invention and heretofore unavailable in the prior art.

Referring to FIG. 8, an alternative means of communication between the online service provider 2 or the coupon distributor 16 and the remote computer 6 is illustrated. A satellite communications apparatus 94 is advantageously used to provide a wireless data link 4. In this embodiment, the data communications interface 20 is a satellite antenna dish or other transceiver unit which provides operative communication between the remote computer 6 and the satellite 94. A similar unit is located at the online service provider 2 in order for full wireless data communications to be achieved.

The flowchart of FIG. 9 illustrates the flow of information in the system of the present invention. The information flow illustrated therein has been described in detail in connection with the implementing system.

In a further alternative embodiment of the present invention, the functions of the online service provider 2 are carried out at a site on the Internet. That is, a user may access the coupon repository by accessing an appropriate Internet site. In this embodiment, the downloaded coupon management routines are encoded with a unique user identification number, which may be for example the user's e-mail Internet address. When the user requests coupon data packages to be transmitted, the user identification number is encrypted and sent to the Internet site along with the request. Appropriate routines are implemented at the Internet site to decrypt the user's identification number and compare it against a list of valid members in order to ensure the validity of the user.

In another alternative embodiment of the present invention, all coupon data management functions are carried out by the online service provider 2 rather than by the offline coupon data management routines 32. In this case, the speed of access of the online service provider 2 must be high, for example on the order of 28.8 kbps. When high speed communications are used, the need for offline data manipulation is eliminated and all processing can be carried out in an efficient manner while connected to the online provider 2.

Readable images, such as bar codes, are used extensively for various purposes and in numerous applications. In particular, bar codes are used in transaction applications, such as in the redemption and tracking of coupons, wherein the bar code image represents one or more transaction data. Examples of transaction data represented by or encoded within bar codes used in coupons, incentives or other such documents include: redemption amount; expiration or term of offer; identity of coupon holder, issuer, redeemer, subject product or service; and many other pertinent or desirable information. In a coupon issuing or distribution system of the present invention a predefined document format is applied in a universal or nearly universal fashion in which a predefined area is reserved or assigned for use in applying a bar code while other areas are reserved for other images or information. Often, electronic information representing the bar code image and the other reserved fields are transmitted or delivered to a station, typically a PC and connected printer, which has stored in its memory an executable document generating module or program.

The document generating module creates a desired document, such as a coupon, by applying the predefined document formatting rules to the received document information, such as the fixed and variable data discussed hereinabove. The created document is then delivered to the attached station printer for generating a printed document that is consistent with the document format and that displays the received document information, as well as other fixed information that may be included within the formatting module. Where a plurality of remote users access and print coupons from a variety of remote station configurations having a variety of printer types, the particular resolution associated with each such printer type may vary widely. Inaccuracies arise when the pixel width of a bar code image does not match or align with the available pixels in a defined width based on a given printer's resolution.

A very basic example of this is illustrated in the series of FIGS. 11A–11D, wherein a bar code 200 has a pixel width PW of two and the bar code comprises one black stripe 202 adjacent one white stripe 204. For a given printer having a resolution of 3, the prior art methods would stretch the image by a factor of 1.5 and every third pixel column would be interpolated to generate print information. This misalignment factor of 3 is arrived at be taking the print area width, 3, and dividing by the difference (3−2=1) between the print area, 3, and the bar code pixel width, 2. The prior art rendering methods would result in a printed image having one of the following bar sequences: 1) black, gray, white, FIG. 11B; 2) black, black, white, FIG. 11C; or 3) black, white, white, FIG. 11D. In all three of these resulting stripe sequences the printed image is an inaccurate representation of the original bar code data and the bar code reader will detect the inaccuracies and the decoder will compile inaccurate data therefrom.

FIG. 12 is a block diagram according to one embodiment of the invention. As shown, the system is depicted as being part of an Internet-based coupon delivery system, of course the invention is not limited to Internet applications and may be utilized in any distributed network environment including wired, wireless, and hybrid wired/wireless systems. Also, although the system of FIG. 12 illustrates an incentives model involving a redemption/retail facility, the invention is not so limited and may be used in a wide variety of applications where bar code images are used.

In FIG. 12, the online service provider 2 is connected to remote user stations A and B, 114 and 118, respectively, such as personal computers remotely located at users' residences or places of business or kiosks located at retail facilities or in other public places. The remote stations 114 and 118 may be connected to the online service provider 2 in any of a number of known ways, including by accessing the service provider via server 144 over the Internet at a web site maintained on the World Wide Web. In addition, the online service provider and its databases, such as coupon information database 138 and a user profile database 140, may be accessed by the coupon issuer 16 and/or redemption/retail facilities 112. As described elsewhere herein, the redemption facility, the retail facility and the coupon issuer, as well as the online service provider, may be a common physical site or a combination of some or all of such sites. Additional intermediary services or access points also may be configured into the coupon distribution and management system employing the bar code rendering system of the present invention.

Also as described elsewhere herein, a coupon management routine or module is downloaded into the memory of the remote stations and is engaged upon establishing a connection between the online service provider 2 and any of the remote stations 114 and 118 to manage the processing of requests for coupons, incentives or the like. The coupon management module contains a scaling module which detects the resolution of an attached rendering device (e.g., a display, a printer or other rendering device), such as printer A 116 attached to remote user station A 114. Alternatively a controller module or function at the online service provider may perform such functions or routines. The scaling module operates according to an algorithm to optimize the size of the bar code image and cooperates with other processes within the coupon management module or controller to control the rendering of the optimum bar code image.

The scaling module or some appurtenant routine detects the resolution of the attached printer and optimizes the scale of the bar code so that the scaled bar code image pixel width aligns perfectly with the print area pixel width to effectively eliminate inaccurate renderings and the resulting inaccurate deciphering of the bar code information. The bar codes are always the theoretical ideal of a scalable bar code, the scaled image will always be a whole integer multiple of the bar code pixel width PW. For example, if a bar code is 118 pixel units wide, and the print area width is 450 pixels, the system will not attempt to stretch the bar code image to 450 pixels, as done in prior art systems. Rather, the system of the present invention will only use the greatest whole number multiple of the number of required pixels to insure that the pixel data is aligned with the available pixel columns and centers the image in the total available pixels. For example, the scaling module will scale the bar code to 354 pixels (3 times the 118 pixel requirement) and center those 354 pixels in the 450 pixels available on the printer. If however, the coupon were being rendered on a printer with a resolution of 500 dpi, the UPC bar code could be scaled to 472 pixels (4 times 118 pixel width).

With reference to FIG. 12, another example involves the coupons 122 and 124 that are printed by two different printers of differing resolution, printer A 116 and printer B 120, such as by remote users operating personal computers at remote stations A and B, 114 and 118. The coupons 122 and 128 are generated from coupon information received from the online service provider 2 and include bar code areas 126 and 132, respectively, having a predetermined width W, measured in inches. For purposes of this description, we will assume that the bar codes 124 and 130 printed on the coupons are required to have a unit pixel width of PW (e.g., 118 pixels) and that W is greater than or equal to PW. We will further assume that the printer used to print the coupon 122, Printer A 116, has a resolution, $R_A$, of 300 dpi and the printer used to print the coupon 128, Printer B 120, has a resolution, $R_B$, of 450 dpi. Further assume that the bar code areas 126 and 132 have a width W of two (2) inches. By multiplying the width of two inches by the pixel resolution of the printers, we arrive at Printer A having 600 pixels available for the bar code 124 and Printer B having 900 pixels available for the bar code 130.

In accordance with the methods and practices of the prior art, the bar code 124 is enlarged by a stretching factor of 5.08, which is relatively close to a whole number integer value. The resulting misalignment factor is calculated by dividing the print area width, 600, by the difference between the print area width and the whole integer product, 590 (5 times 118), which results in a relatively high factor of 60. This means that only about one out of every 60 pixel columns over the width of the print area will be interpolated in some fashion. Because the instances of interpolation are very few, the problems associated with aliasing or interpolating bar code stripes or lines, including image degradation and blurring and other errors, is relatively low. The bar code 130 of the coupon 128 is stretched by a factor of 7.627, which is the pixel area, 900, divided by the pixel width, 118.

Figure 15:
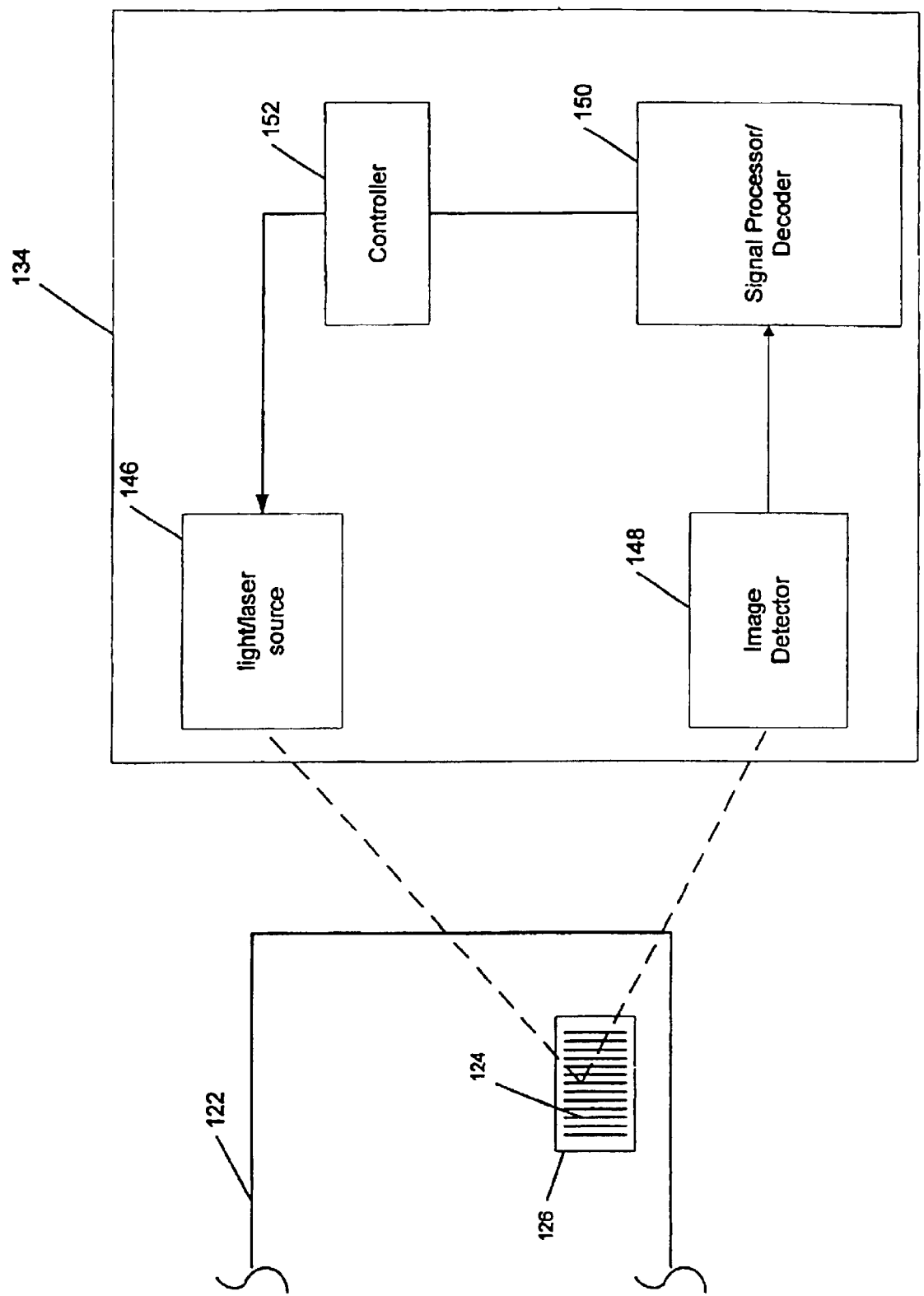
FIG. 15 is a schematic diagram of a bar code reading apparatus such as employed in either a retail or redemption facility of FIG. 12.

The bar code image is processed and stretched to occupy the entire available printer width of 900 pixels. In this manner the bar code "straddles" the available pixels of the print area width. The misalignment factor, 12.16, is the print area width, 900, divided by the difference, 74, between the print area width, 900, and the scaled bar code area, 826 (7 times 118). Accordingly, the prior art aliasing technique would result in interpolating print data for every twelfth pixel column, this leads to significant blurring and degradation of the image in the manner discussed above. Accordingly, when a bar code reader, such as bar code reader 134 of FIG. 15, is used to scan, detect and decode the presented bar code image 130, the reader may generate faulty data due to the inaccurate rendering of the bar code data.

Figure 14A:
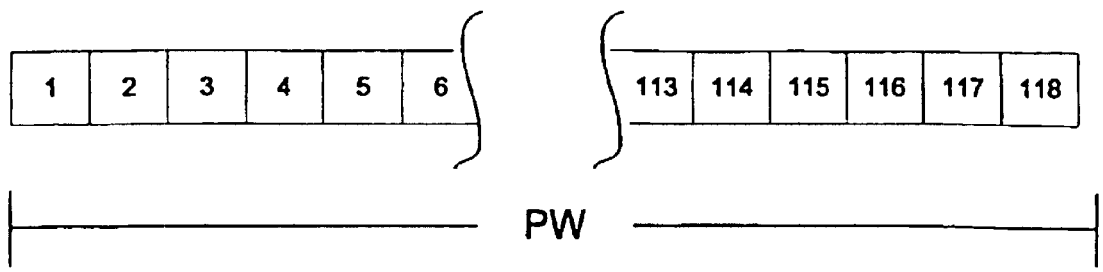
FIG. 14a is a bar chart illustrating the pixel width PW of the bar code image that is scaled and imprinted on coupons and other documents and things using the bar code rendering technique of FIGS. 12 and 13.
Figure 14B:
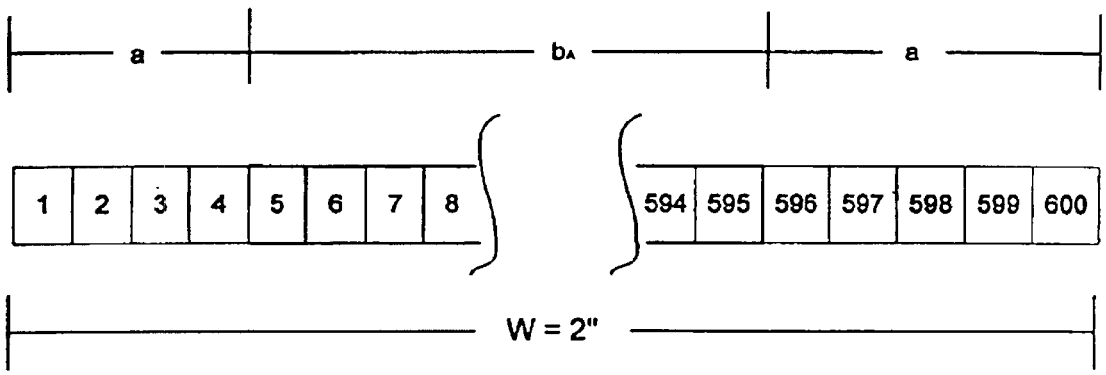
FIG. 14b is a bar chart illustrating the pixel layout associated with the Printer A and the relative position of the scaled bar code image using the bar code rendering technique of FIGS. 12 and 13.
Figure 14C:
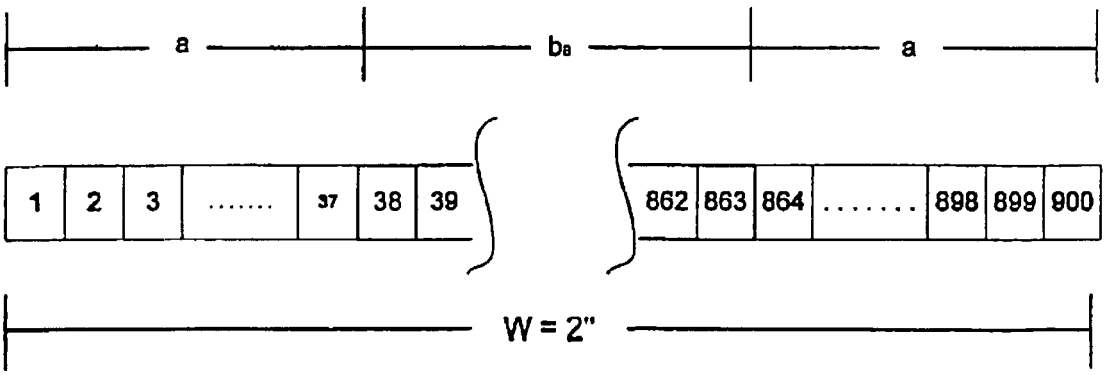
FIG. 14c is a bar chart illustrating the pixel layout associated with the Printer B and the relative position of the scaled bar code image using the bar code rendering technique of FIGS. 12 and 13.

By contrast, the whole integer scaling of the present invention only enlarges the image based on the largest whole integer multiple of the pixel width into the defined print area width. In this manner the pixel width of the scaled bar code image perfectly aligns with the available pixel columns along the width of the print area and no interpolation of print data is required to "fill in" missing data. As shown in FIG. 14b, for the pixel column mapping of the printer A 114, the scaled bar code image 124 (590 pixels in width), $b_A$, is centered and aligns with pixel columns 6 through 595 with the excess areas defined by a, pixel columns 1-5 and 596-600 being empty. As shown in FIG. 14c, for the pixel column mapping of the printer B 118, the scaled bar code image 130 (826 pixels in width), $b_B$, is centered and aligns with pixel columns 38 through 863 with the excess areas defined by a, pixel columns 1-37 and 864-900 being empty.

The relationship of the whole integer scaling is:

$$SF=(W \times R)/PW$$

where SF is the bar code scaling factor, W is the print area width in inches, R is the resolution characteristic of the printer in dpi, and PW is the pixel width of the bar code in pixels. Centering of the scaled bar code is accomplished by determining the excess pixel columns, EP, along the width of the print area:

$$(W \times R)-(SF \times PW)=EP$$

Once this is calculated then the EP value is divided by two and the scaled bar code is positioned such that ½ EP pixels are on each side of the bar code within the print area, as shown in FIGS. 14b and 14c and as described above.

Figure 13:
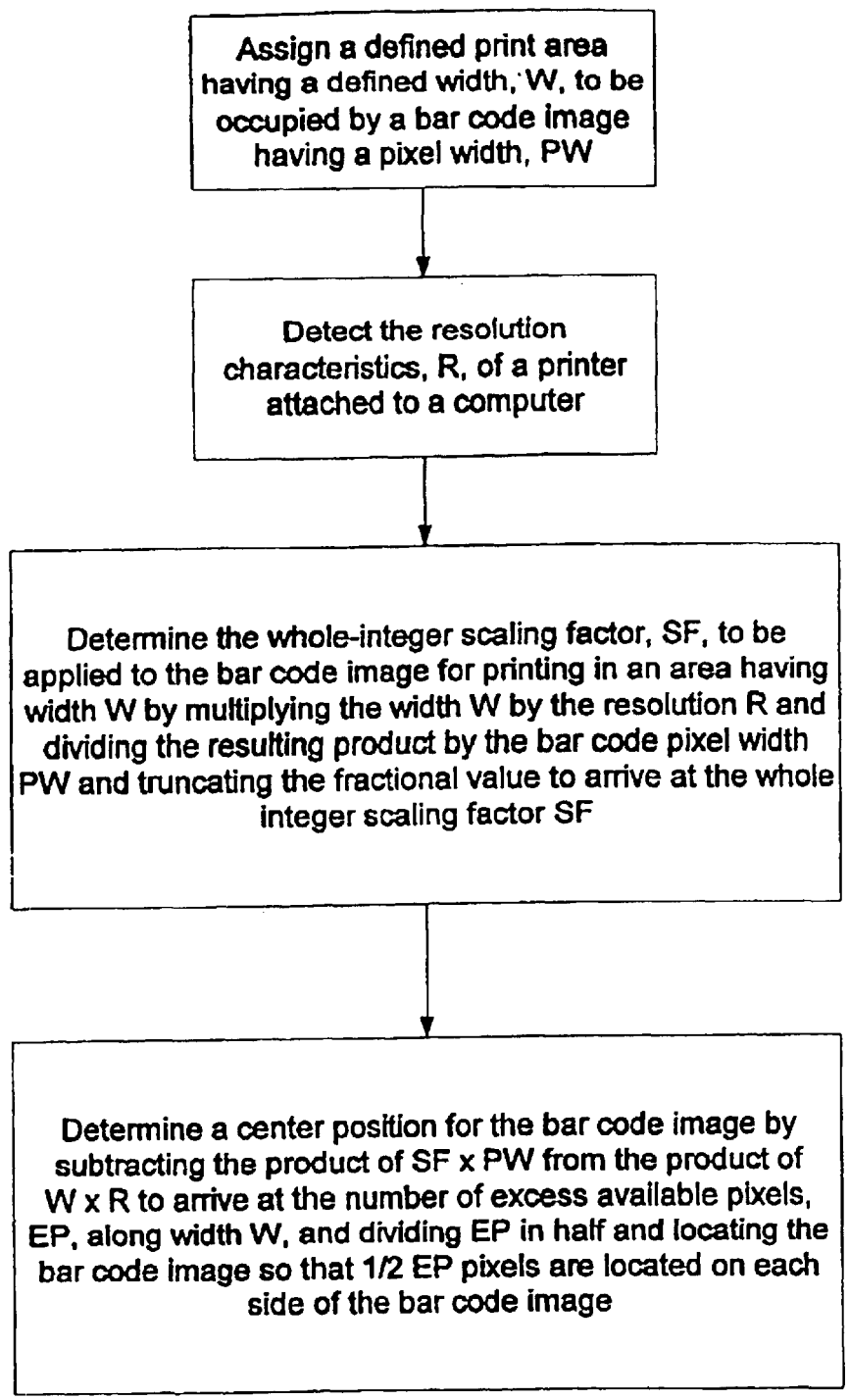
FIG. 13 is a flow chart illustrating a method of implementing the bar code rendering technique of the present invention.

FIG. 13 is a flow chart illustrating a method of implementing the bar code rendering technique of the present invention. Initially a document, such as a coupon, may be formatted such that a defined area is reserved for a bar code image. The defined area includes defined width, W, and/or a defined height, H, which is measured in inches. For instance, as discussed hereinabove, a fixed data file representing a coupon format may be generated at a central server and transmitted and downloaded to a remote user terminal for handling the printing of coupons or the like on a local basis. Included in the fixed data will be the formatted location and dimensions for a bar code representing various data, including fixed data, local or otherwise, and variable data, such as data relating to a particular offer that is transmitted from the central server to the remote user upon selection by a user.

The central server or the print control module downloaded at the remote user terminal will include a scaling module which detects the resolution of the printer attached or assigned to or selected by the remote terminal computer in any of a number of ways. For instance, the scaling module, or a separate resolution detection module, will query or otherwise access the interface between an operating system, such as Microsoft Windows®, and the print driver in the remote user computer. Such information typically resides at the operating system level, however it is fully contemplated by the present invention to directly query an attached printer to obtain resolution characteristic data, such as via printer onboard diagnostic functions. Once the resolution is determined then the scaling function is carried out, as described hereinabove, and the bar code image is centered along the width of the print area.

FIG. 15 is a schematic diagram of a bar code reading apparatus 134 for reading bar code images, such as bar code image 124. Typically, a light source illuminates the bar code area 126 whereby the varying reflectivity characteristics associated with the white and black stripes or spaces of the bar code 124 are detected by image detector 148, which generates electrical signals representative of the bar code image and transmits such signals to the signal processor/decoder 150, in some instances this may involve an analog-digital conversion or other effective operations. A controller or other processor supervises control of the light source 146 and processing or interpretation of the decoded information represented by the bar code 124 for use by some device or process, such as determining a coupon amount, expiration date, product or user identity, etc. This information may be forwarded to additional devices for further processing. Although one particular bar code reader arrangement is discussed herein, it should be understood that there are numerous methods and systems for bar code reading and the present invention is not so limited to the disclosed system.

While the scaling factor of the present invention is preferably a whole integer, it should be understood that the objects of the present invention can be essentially achieved and greater accuracy obtained as the scaling factor approaches a whole integer. A critical aspect is lowering the misalignment factor and negating the interpolation process. As the scaling factor approaches a whole integer, but is not exactly a whole integer, fewer and fewer pixel columns are interpolated and greater accuracy is achieved. Also, while the invention has been described in connection with a coupon delivery system, it is understood that the method and system for rendering and recognizing bar codes of the present invention fully contemplates additional applications, especially involving all types of document generation and reading to enhance quality and approach error-free data extraction.

What is claimed is:

1. A system for rendering an image using a rendering device, the image comprising a bar code within a bar code display area, the bar code having a minimum unit display size requirement, the bar code display area having a maximum display size in at least a first direction, and the rendering device having a resolution, the system comprising:

means for detecting the resolution of the rendering device; and means for scaling the bar code by a scaling a factor to a size that is essentially a largest whole number multiple of the minimum unit display size, but less than the product of the maximum display size multiplied by the detected resolution of the rendering device.

2. The system of claim 1, wherein the image is a coupon, the rendering device is a printer and the bar code comprises one or more of a UPC bar code or a unique coupon identifier.

3. The system of claim 1, wherein the detector means accesses an interface between computer hardware and rendering device hardware to acquire data relating to the resolution of the rendering device.

4. The system of claim 1, wherein the rendering device is a printer.

5. The system of claim 1, wherein the minimum unit display size has a width PW and the maximum display size include a width W, the scaling factor is a whole number and resolution units along PW align essentially exactly with resolution units along W of the display.

6. The system of claim 1, wherein the scaling factor is a whole number.

7. The system of claim 1, further comprising means for comparing the rendering device resolution and the bar code minimum unit display size to determine whether scaling of the bar code is necessary.

8. A system for rendering an image using a rendering device, the image comprising a bar code within a bar code display area, the bar code having a minimum unit display size requirement, the bar code display area having a maximum display size in at least a first direction, and the rendering device having a resolution, the system comprising:

a detector for detecting the resolution of the rendering device; and a scaler for scaling the bar code by a scaling a factor to a size that is essentially a largest whole number multiple of the minimum unit display size, but less than the product of the maximum display size multiplied by the detected resolution of the rendering device.

9. The system of claim 8, wherein the image is a coupon, the rendering device is a printer and the bar code comprises one or more of a UPC bar code or a unique coupon identifier.

10. The system of claim 8, wherein the detector accesses an interface between computer hardware and rendering device hardware to acquire data relating to the resolution of the rendering device.

11. The system of claim 8, wherein the rendering device comprises a printer.

12. The system of claim 8, wherein the minimum unit display size has a width PW and the maximum display size include a width W, the scaling factor is a whole number and resolution units along PW align essentially exactly with resolution units along W of the display.

13. The system of claim 8, wherein the scaling factor is a whole number.

14. The system of claim 8, further comprising a comparator for comparing the rendering device resolution and the bar code minimum unit display size to determine whether scaling of the bar code is necessary.

15. A method for rendering an image, the image comprising a bar code within a bar code display area, the bar code having a minimum unit display size requirement, the bar code display area having a maximum display size in at least a first direction, the steps comprising:

determining a resolution of a rendering device; and scaling the bar code by a scaling a factor to a size that is essentially a largest whole number multiple of the minimum unit display size, but less than the product of the maximum display size multiplied by the determined resolution of the rendering device.

16. The method of claim 15, further comprising the step of imprinting the scaled bar code onto the bar code display area.

17. The method of claim 15, wherein the minimum unit display size has a width PW and the maximum display size include a width W, the scaling factor is a whole number and resolution units along PW align essentially exactly with resolution units along W of the display.

18. A method for enabling, via a remote terminal, the viewing of information about available incentives, the selection of desired incentives, and the printing of selected incentives, wherein a printed incentive includes a bar code, the method comprising:

storing information pertaining to a group of available incentives at one or more Internet-accessible locations;

downloading, from an Internet-accessible location to a remote terminal, print management software for use in printing selected incentives via a printer associated with the remote terminal, the print management software being operable to:

(i) detect a resolution of the printer associated with the remote terminal;

(ii) use the detected resolution to determine a scaling factor for scaling a bar code to be printed on the printed incentive; and (iii) cause the printer to print an incentive with a bar code scaled according to the determined scaling factor.

19. The method of claim 18, wherein incentives comprise coupons.

20. The method of claim 18, further comprising:

receiving at an Internet-accessible location, from a user of a remote terminal, a request for access to the stored incentive information;

determining at the Internet-accessible location if the user is a registered user, and if the user is not registered:
      transmitting a prompt to the user's remote terminal to electronically complete a user profile; and
      receiving and storing the user profile.

21. The method of claim 18, wherein the print management software accesses an operating system of the remote terminal to detect, from a print driver, the resolution of the printer associated with the remote terminal.

22. The method of claim 18, wherein the print management software accesses the printer associated with the remote terminal to detect the resolution of the printer.

23. The method of claim 18, wherein the bar code comprises one or more of a UPC bar code or a unique coupon identifier.

24. The method of claim 18, wherein a bar code printed on a printed incentive is scaled to fit within a bar code display area on the printed incentive.

25. The method of claim 24, wherein the bar code has a minimum unit display size requirement and the bar code display area has a maximum size in at least a first direction.

26. The method of claim 25, wherein the bar code is scaled by the scaling factor to a size that is essentially a largest whole number multiplier of the minimum unit display size, but less than the product of the maximum display size multiplied by the detected resolution of the printer.

27. The method of claim 25, further comprising comparing the resolution of the printer and the bar code minimum unit display size to determine whether scaling of the bar code is necessary.

28. The method of claim 18, wherein the scaling factor is a whole number.

29. A system for enabling, via a remote terminal, the viewing of information about available incentives, the selection of desired incentives, and the printing of selected incentives, wherein a printed incentive includes a bar code, the system comprising:

means for storing information pertaining to a group of available incentives at one or more Internet-accessible locations;

means for downloading, from an Internet-accessible location to a remote terminal, print management software for use in printing selected incentives via a printer associated with the remote terminal, the print management software comprising:

means for detecting a resolution of the printer associated with the remote terminal;

means for using the detected resolution to determine a scaling factor for scaling a bar code to be printed on the printed incentive; and means for causing the printer to print an incentive with a bar code scaled according to the determined scaling factor.

30. The system of claim 29, wherein incentives comprise coupons.

31. The system of claim 29, further comprising:

means for receiving at an Internet-accessible location, from a user of a remote terminal, a request for access to the stored incentive information;

means for determining at the Internet-accessible location if the user is a registered user, and if the user is not registered:

means for transmitting a prompt to the user's remote terminal to electronically complete a user profile; and means for receiving and storing the user profile.

32. The system of claim 29, wherein the print management software accesses an operating system of the remote terminal to detect, from a print driver, the resolution of the printer associated with the remote terminal.

33. The system of claim 29, wherein the print management software accesses the printer associated with the remote terminal to detect the resolution of the printer.

34. The system of claim 29, wherein the bar code comprises one or more of a UPC bar code or a unique coupon identifier.

35. The system of claim 29, wherein a bar code printed on a printed incentive is scaled to fit within a bar code display area on the printed incentive.

36. The system of claim 35, wherein the bar code has a minimum unit display size requirement and the bar code display area has a maximum size in at least a first direction.

37. The system of claim 36, wherein the bar code is scaled by the scaling factor to a size that is essentially a largest whole number multiplier of the minimum unit display size, but less than the product of the maximum display size multiplied by the detected resolution of the printer.

38. The system of claim 36, further comprising means for comparing the resolution of the printer and the bar code minimum unit display size to determine whether scaling of the bar code is necessary.

39. The system of claim 29, wherein the scaling factor is a whole number.

* * * * *